US010081266B2

(12) United States Patent
Draeger et al.

(10) Patent No.: US 10,081,266 B2
(45) Date of Patent: Sep. 25, 2018

(54) COIL COVERAGE

(71) Applicant: Fraunhofer-Gesellschaft zur Foerderung der angewandten Forschung e.V., Munich (DE)

(72) Inventors: Tobias Draeger, Baiersdorf (DE); Josef Bernhard, Nabburg (DE); Martin Guettler, Rednitzhembach (DE); Markus Hartmann, Sulzbach-Rosenberg (DE)

(73) Assignee: Fraunhofer-Gesellschaft zur Foerderung der Angewandten Forschung e.V., Munich (DE)

(*) Notice: Subject to any disclaimer, the term of this patent is extended or adjusted under 35 U.S.C. 154(b) by 86 days.

(21) Appl. No.: 15/416,413

(22) Filed: Jan. 26, 2017

(65) Prior Publication Data
US 2017/0136906 A1  May 18, 2017

Related U.S. Application Data

(63) Continuation of application No. PCT/EP2015/067827, filed on Aug. 3, 2015.

(30) Foreign Application Priority Data

Aug. 4, 2014 (DE) .................. 10 2014 215 350

(51) Int. Cl.
*H02J 7/00* (2006.01)
*B60L 11/18* (2006.01)
(Continued)

(52) U.S. Cl.
CPC ......... *B60L 11/1829* (2013.01); *B60L 11/182* (2013.01); *G01D 5/2006* (2013.01); *H02J 7/025* (2013.01); *H02J 50/10* (2016.02)

(58) Field of Classification Search
CPC ........ H02J 7/025; H01F 38/14; Y02T 90/122; B60L 11/182; Y02E 60/12
(Continued)

(56) References Cited

U.S. PATENT DOCUMENTS

| 4,812,812 A | 3/1989 | Flowerdew et al. |
| 8,749,385 B2 | 6/2014 | Bernhard et al. |

(Continued)

FOREIGN PATENT DOCUMENTS

| DE | 10 2012 006 919 | 10/2013 |
| JP | 2005-128035 | 5/2005 |
| JP | 2014-518607 | 7/2014 |

OTHER PUBLICATIONS

Office Action dated Feb. 6, 2018 in parallel Japanese Application No. 2017-506265.

*Primary Examiner* — Arun Williams
(74) *Attorney, Agent, or Firm* — Dicke, Billig & Czaja, PLLC

(57) ABSTRACT

Embodiments of the present invention provide a measuring device with a receiver coil array and evaluator. The receiver coil array is configured to detect three magnetic field components of a magnetic field of a conductor loop array generated by an electric alternating current signal and to provide a magnetic field component signal for each of the detected three magnetic field components. The evaluator is configured to evaluate the magnetic field component signals in order to determine the phase relation to the electric alternating current signal allocated for the magnetic field component signals, wherein the phase relations each include coarse position information of the conductor loop array relative to the conductor loop array and wherein the evaluator is configured to determine a resulting intersection of the coarse position information, wherein the resulting intersec- (Continued)

tion includes or results in fine position information of the receiver coil array relative to the conductor loop array.

20 Claims, 15 Drawing Sheets

(51) Int. Cl.
*H02J 7/02* (2016.01)
*H02J 50/10* (2016.01)
*G01D 5/20* (2006.01)

(58) Field of Classification Search
USPC .......................................................... 320/108
See application file for complete search history.

(56) References Cited

U.S. PATENT DOCUMENTS

| | | |
|---|---|---|
| 9,453,933 B2 | 9/2016 | Hua et al. |
| 2001/0047133 A1 | 11/2001 | Gilboa et al. |
| 2010/0151789 A1* | 6/2010 | Suzuki .................. G01S 5/0036 455/41.2 |
| 2012/0262002 A1 | 10/2012 | Widmer et al. |
| 2014/0055404 A1* | 2/2014 | Cho .................... G06F 3/03545 345/174 |
| 2014/0159651 A1 | 6/2014 | Von Novak et al. |
| 2014/0195138 A1* | 7/2014 | Stelzig ................. G08G 1/0116 701/119 |
| 2015/0028849 A1 | 1/2015 | Covic et al. |
| 2016/0139288 A1 | 5/2016 | Draeger et al. |

\* cited by examiner

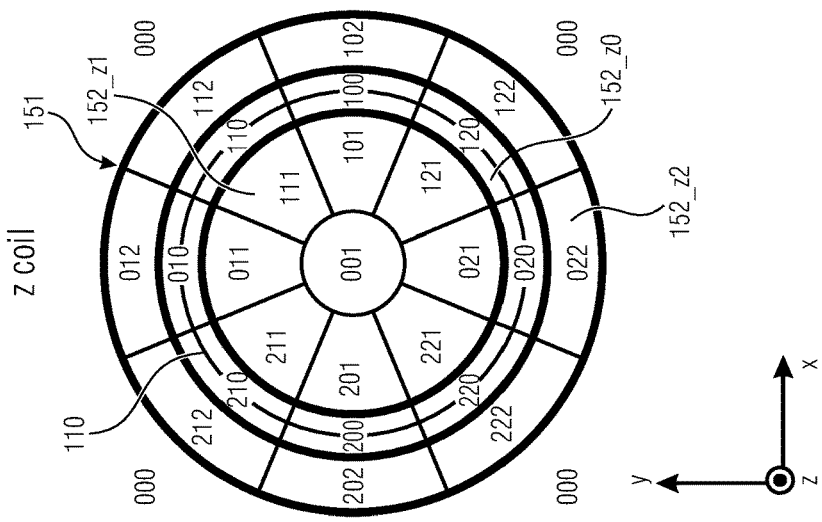
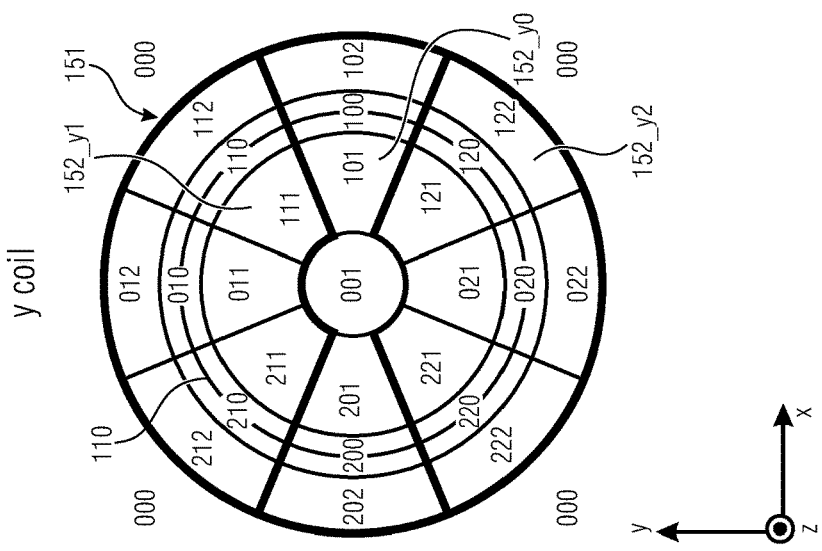
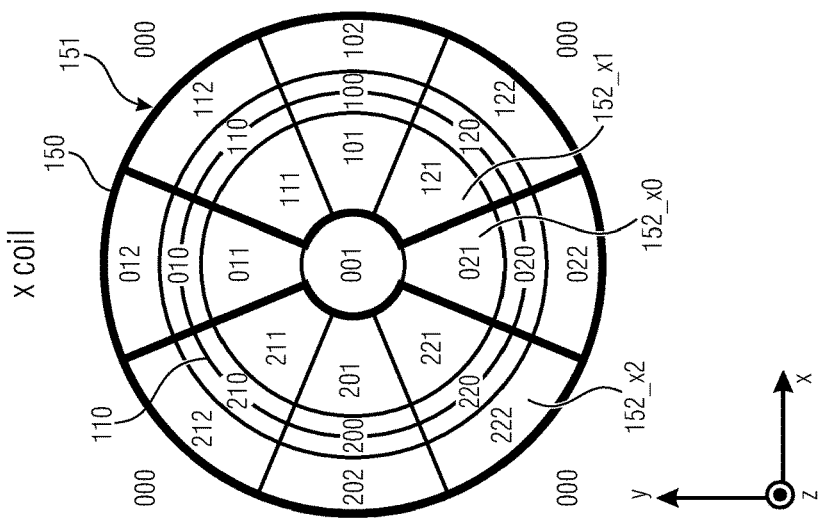

COIL COVERAGE

CROSS-REFERENCE TO RELATED APPLICATIONS

This application is a continuation of copending International Application No. PCT/EP2015/067827, filed Aug. 3, 2015, which is incorporated herein by reference in its entirety, and additionally claims priority from German Application No. 10 2014 215 350.6, filed Aug. 4, 2014, which is also incorporated herein by reference in its entirety.

Embodiments of the present invention relate to a measuring device, a positioning system and a measuring method. Further embodiments relate to a data transmission device, a data transmission system and a method for data transmission with predetermined position. Some embodiments relate to a coil coverage.

BACKGROUND OF THE INVENTION

Systems for wireless energy transmission by means of coils (magnetic field) depend, as regards to their efficiency, heavily on the correct alignment and hence sufficient coupling of a transmitter and receiver coil. Even small deviations from the ideal position have a strong effect on the obtainable signal strength at the receiver and on the system efficiency.

Currently, several approaches exist for ensuring exact positioning. Mechanical fixing of the coil by means of housing shape or magnets, whereby primary and secondary coils are forced to the correct position, is known. Further, one-sided usage of a coil array is known which is optimally wired according to the position of the other transmission side. Further, moveable coils on a transmission side are known, which are guided to the optimum position by measuring the coupling between two coils. Above that, specific coil geometries are known, which allow a wider field distribution and hence more position-tolerant positioning.

However, the above-described approaches for positioning coils are either very expensive to implement or not suitable for positioning mobile coils.

SUMMARY

According to an embodiment, a measuring device may have: a receiver coil array that is configured to detect three magnetic field components of a magnetic field of a conductor loop array generated by an electric alternating current signal and to provide a magnetic field component signal for each of the detected three magnetic field components, wherein the receiver coil array is configured to detect the three magnetic field components along linearly independent directions; and evaluation means that is configured to evaluate the magnetic field component signals for determining, for the magnetic field component signals, allocated phase relations to the electric alternating current signal, wherein the phase relations each include coarse position information of the receiver coil array relative to the conductor loop array, and wherein the evaluation means is configured to determine a resulting intersection of the coarse position information, wherein the resulting intersection includes fine position information of the receiver coil array relative to the conductor loop array.

According to another embodiment, a positioning system may have: an inventive measuring device; and a conductor loop array.

Another embodiment may have the usage of an inventive measuring device for positioning a vehicle on a charging device for charging an electric energy storage of the vehicle, wherein the charging device includes the conductor loop array.

According to another embodiment, a measuring method may have the steps of: detecting three magnetic field components of a magnetic field of a conductor loop array generated by an electric alternating current signal, wherein the magnetic field components are detected along linearly independent directions; providing a magnetic field component signal for each of the detected three magnetic field components; and evaluating the magnetic field component signals for determining, for the magnetic field component signals, allocated phase relations to the electric alternating current signal, wherein the phase relations each include coarse position information of the receiver coil array relative to the transmitter coil array; wherein evaluating includes determining a resulting intersection of the coarse position information, wherein the resulting intersection includes/results in fine position information of the receiver coil array relative to the conductor loop array.

Another embodiment may have a non-transitory digital storage medium having a computer program stored thereon to perform the measuring method, the method having the steps of: detecting three magnetic field components of a magnetic field of a conductor loop array generated by an electric alternating current signal, wherein the magnetic field components are detected along linearly independent directions; providing a magnetic field component signal for each of the detected three magnetic field components; and evaluating the magnetic field component signals for determining, for the magnetic field component signals, allocated phase relations to the electric alternating current signal, wherein the phase relations each include coarse position information of the receiver coil array relative to the transmitter coil array; wherein evaluating includes determining a resulting intersection of the coarse position information, wherein the resulting intersection includes/results in fine position information of the receiver coil array relative to the conductor loop array, when said computer program is run by a computer.

According to another embodiment, a data transmission device may have: a data transceiver; a receiver coil array that is configured to detect at least one magnetic field component of a magnetic field of a conductor loop array generated by an electric alternating current signal of a further data transmission device and to provide a magnetic field component signal for the detected magnetic field component; evaluation means configured to evaluate the magnetic field component signal for determining a phase relation between the magnetic field component signal and the electric alternating current signal, wherein the phase relations include position information indicating whether a projection of the receiver coil array is perpendicular to a conductor loop area inside the conductor loop area, wherein the conductor loop area is within a plane spanned by the conductor loop array, and wherein the conductor loop area is limited by the conductor loop array; and control means configured to enable data transmission of the data transceiver only when the projection of the receiver coil array is perpendicular to the conductor loop area inside or outside the conductor loop area.

According to another embodiment, a data transmission system may have: an inventive data transmission device; and a further data transmission device with the conductor loop array.

According to another embodiment, a method for data transmission between a data transmission device and a further data transmission device may have the steps of: detecting a magnetic field component of a magnetic field of a conductor loop array generated by an electric alternating current signal; providing a magnetic field component signal for the detected magnetic field component; evaluating the magnetic field component signal for determining a phase relation between the magnetic field component signal and the electric alternating current signal, wherein the phase relations include position information indicating whether a projection of the receiver coil array is perpendicular to a conductor loop area inside the conductor loop area, wherein the conductor loop area is within a plane that is spanned by the conductor loop array and wherein the conductor loop area is limited by the conductor loop array; enabling data transmission between the data transmission device and the further data transmission device if the projection of the receiver coil array perpendicular to the conductor loop area is inside or outside the conductor loop area.

Embodiments of the present invention provide a measuring device with a receiver coil array and evaluation means. The receiver coil array is configured to detect three magnetic field components of a magnetic field of a conductor loop array generated by an electric alternating current signal and to provide a magnetic field component signal for each of the detected three magnetic field components. The evaluation means is configured to evaluate the magnetic field component signals for determining the allocated phase relation to the electric alternating current signal for the magnetic field component signals, wherein the phase relations each comprise coarse position information of the conductor loop relay relative to the conductor loop array, and wherein the evaluation means is configured to determine a resulting intersection of the coarse position information, wherein the resulting intersection comprises or results in fine position information of the receiver coil array relative to the conductor loop array.

According to the concept of the present invention, a position of a receiver coil array relative to a conductor loop array emitting a magnetic field can be determined by detecting three components of the magnetic field along linearly independent directions to obtain magnetic field component signals, wherein the phase relation of these magnetic field component signals to an electric alternating current signal generating the magnetic field comprises coarse position information of the receiver coil array relative to the conductor loop array. Due to the fact that the magnetic field components are detected along linearly independent directions, the coarse position information that can be inferred from the phase relations between the magnetic field component signals and the electric alternating current signal are also independent, such that by forming the intersection of the coarse position information, fine position information of the receiver coil array relative to the conductor loop array can be determined.

In embodiments, the measuring device can be used, for example, for positioning a vehicle on a charging device for charging an electric energy storage of the vehicle, wherein the charging device comprises the conductor loop array.

Further embodiments provide a measuring method. The measuring method includes a step of detecting three magnetic field components of a magnetic field of a conductor loop array generated by an electric alternating current signal, wherein the magnetic field components are detected along linearly independent directions; a step of providing a magnetic field component signal for each of the detected three magnetic field components; and a step of evaluating the magnetic field component signals for determining, for the magnetic field component signals, allocated phase relations to the electric alternating current signal, wherein the phase relations each comprise coarse position information of the receiver coil array relative to the transmitter coil array, wherein evaluating comprises determining a resulting intersection of the coarse position information, wherein the resulting intersection comprises/results in fine position information of the receiver coil array relative to the conductor loop array.

Further embodiments provide a data transmission device with a data transceiver, a receiver coil array, evaluation means and a control device. The receiver coil array is configured to detect at least one magnetic field component of a magnetic field of a conductor loop array generated by an electric alternating current signal of a further data transmission device and to provide a magnetic field component signal for the detected magnetic field component. The evaluation means is configured to evaluate the magnetic field component signal for determining a phase relation between the magnetic field component signal and the electric alternating current signal, wherein the phase relation comprises position information indicating whether a projection of the receiver coil array is perpendicular to a conductor loop area inside the conductor loop area, wherein the conductor loop area is within a plane that is spanned by the conductor loop array and wherein the conductor loop area is limited by the conductor loop array. The control device is configured to enable data transmission of the data transceiver only when the projection of the receiver coil array perpendicular to the conductor loop area is inside or outside the conductor loop area.

Further embodiments provide a method for data transmission between a data transmission device and a further data transmission device. The method includes detecting a magnetic field component of a magnetic field of a conductor loop array generated by an electric alternating current signal; providing a magnetic field component signal for the detected magnetic field component; evaluating the magnetic field component signal for determining a phase relation between the magnetic field component signal and the electric alternating current signal, wherein the phase relations comprise position information indicating whether a projection of the receiver coil array is perpendicular to a conductor loop area inside the conductor loop area, wherein the conductor loop area is within a plane that is spanned by the conductor loop array, and wherein the conductor loop area is limited by the conductor loop array; and enabling data transmission between the data transmission device and the further data transmission device if the projection of the receiver coil array perpendicular to the conductor loop area is inside or outside the conductor loop area.

BRIEF DESCRIPTION OF THE DRAWINGS

Embodiments of the present invention will be detailed subsequently referring to the appended drawings, in which:

FIG. 5a is a schematic view of three x coarse regions of a positioning area that the measuring means can determine based on the magnetic field component signal of the x coil;

FIG. 5b is a schematic view of three y coarse regions of a positioning area that the measuring means can determine based on the magnetic field component signal of they coil;

FIG. 5c is a schematic view of three z coarse regions of a positioning area that the measuring means can determine based on the magnetic field component signal of the z coil;

DETAILED DESCRIPTION OF THE INVENTION

In the following description of embodiments of the present invention, identical or equal elements are provided with the same reference numbers such that the description of the same is mutually exchangeable.

Figure 1A:
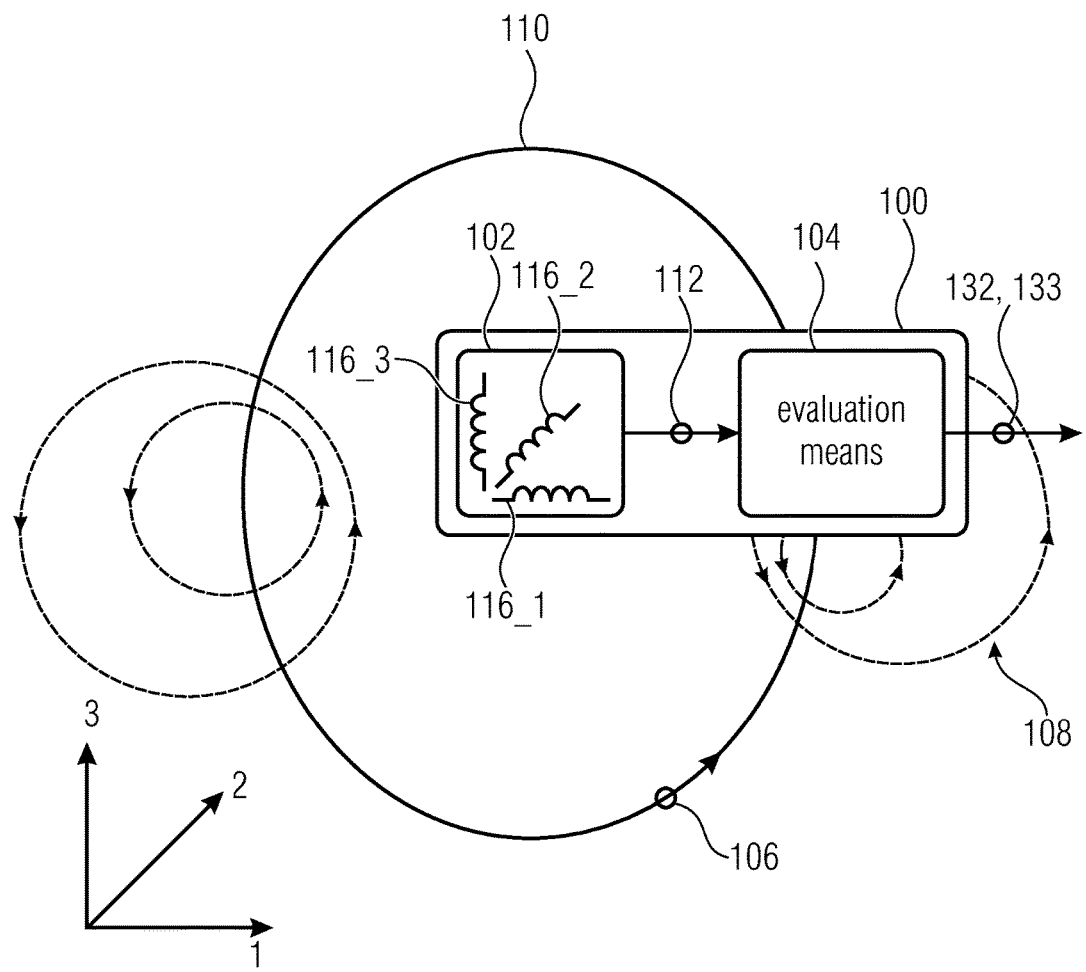
FIG. 1a is a schematic block diagram of a measuring device according to an embodiment of the present invention.

FIG. 1a shows a schematic block diagram of a measuring device 100 according to an embodiment of the present invention. The measuring device 100 comprises a receiver coil array 102 and an evaluation means 104.

The receiver coil array 102 is configured to detect three magnetic field components of a magnetic field 108 of a conductor loop array 110 generated by an electric alternating current signal 106 and to provide a magnetic field component signal 112 for each of the detected three magnetic field components.

The evaluation means 104 is configured to evaluate the magnetic field component signals 112 for determining, for the magnetic field component signals 112, allocated phase relations to the electric alternating current signal 106, wherein the phase relations each comprise coarse position information of the receiver coil array 102 relative to the conductor loop array 110, and wherein the evaluation means 104 is configured to determine a resulting intersection of the coarse position information, wherein the resulting intersection comprises or results in fine position information of the receiver coil array 102 relative to the conductor loop array 110.

The receiver coil array 102 is configured to detect the three magnetic field components along linearly independent directions. FIG. 1 shows exemplarily a coordinate system having three linearly independent directions along which the receiver coil array 102 can detect the three magnetic field components of the magnetic field 108.

In embodiments, the receiver coil array 102 can comprise three coils 116_1 to 116_3 that are arranged relative to one another in order to detect the three magnetic field components of the generated magnetic field 108 of the conductor loop array 110.

Each of the three coils 116_1 to 116_3 can provide one of the three magnetic field component signals 112. For example, a first coil 116_1 of the three coils 116_1 to 116_3 can provide a first magnetic field component signal of the three magnetic field component signals, while a second coil 116_2 of the three coils 116_1 to 116_3 can provide a second magnetic field component signal of the three magnetic field component signals, while a third coil 116_3 of the three coils 116_1 to 116_3 can provide a third magnetic field component signal of the three magnet field component signals.

In embodiments, the receiver coil array 102 can be configured to detect the three magnetic field components along orthogonal directions. In this case, for example, the coordinate system shown in FIG. 1 can be Cartesian (x, y z coordinate system), wherein the first coil 116_1 of the three coils 116_1 to 116_3 of the receiver coil array 102 can be arranged parallel to an x axis of the Cartesian coordinate system, while the second coil 116_2 of the three coils 116_1 to 116_3 of the receiver coil array 102 can be arranged parallel to an y axis of the Cartesian coordinate system, and wherein the third coil 116_3 of the three coils 116_1 to 116_3 of the receiver coil array 102 can be arranged parallel to a z axis of the Cartesian coordinate system.

In the following description, it is assumed in a simplified manner that the receiver coil array 102 is configured to detect three magnetic field components along an orthogonal direction, i.e., parallel to x, y, z axes of the Cartesian coordinate system. However, it should be noted that the invention is not limited to such embodiments. Rather, the receiver coil array 102 can be configured to detect magnetic field components of the magnetic field 108 of the conductor loop array 110 along linearly independent directions.

Further, it should be noted, although FIG. 1 shows a circular conductor loop array 110, the invention is not limited to such embodiments. Rather, the conductor loop array 110 can have any shape, such as a rectangular, square, triangular, polygonal or circular shape.

When transmitting data and/or energy by means of coupled coils (conductor loop arrays), exact positioning of the coils involved in the transmission with respect to one another is decisive for efficient and error-free transmission. By a specific signal shape emitted by a coil and (transmitter) conductor loop array 110, respectively, and received by a further coil and (receiver) conductor loop array, respectively, the alignment of the two coils to one another can be determined based on the received signals and the offset of the coils to one another can also be determined. With this information, the alignment of the coils to one another can be corrected and in that way transmission can be optimized. Additionally, in a communication system, the orientation of the involved coils to one another can be examined.

Thus, in data and/or energy transmission systems having coils (conductor loop arrays, transmitter conductor loop array and receiver conductor loop array) the measuring device 100 enables to obtain information on the alignment and orientation of the involved coils to one another. With this information, optimizing the arrangement in erroneous positioning is possible for obtaining higher transmission efficiency. Thereby, it is also possible to ensure that the involved coils are positioned to one another as desired. This is particularly of interest when several systems are in direct proximity and wrong allocations of communication partners could result, for example due to overshoots.

Figure 1B:
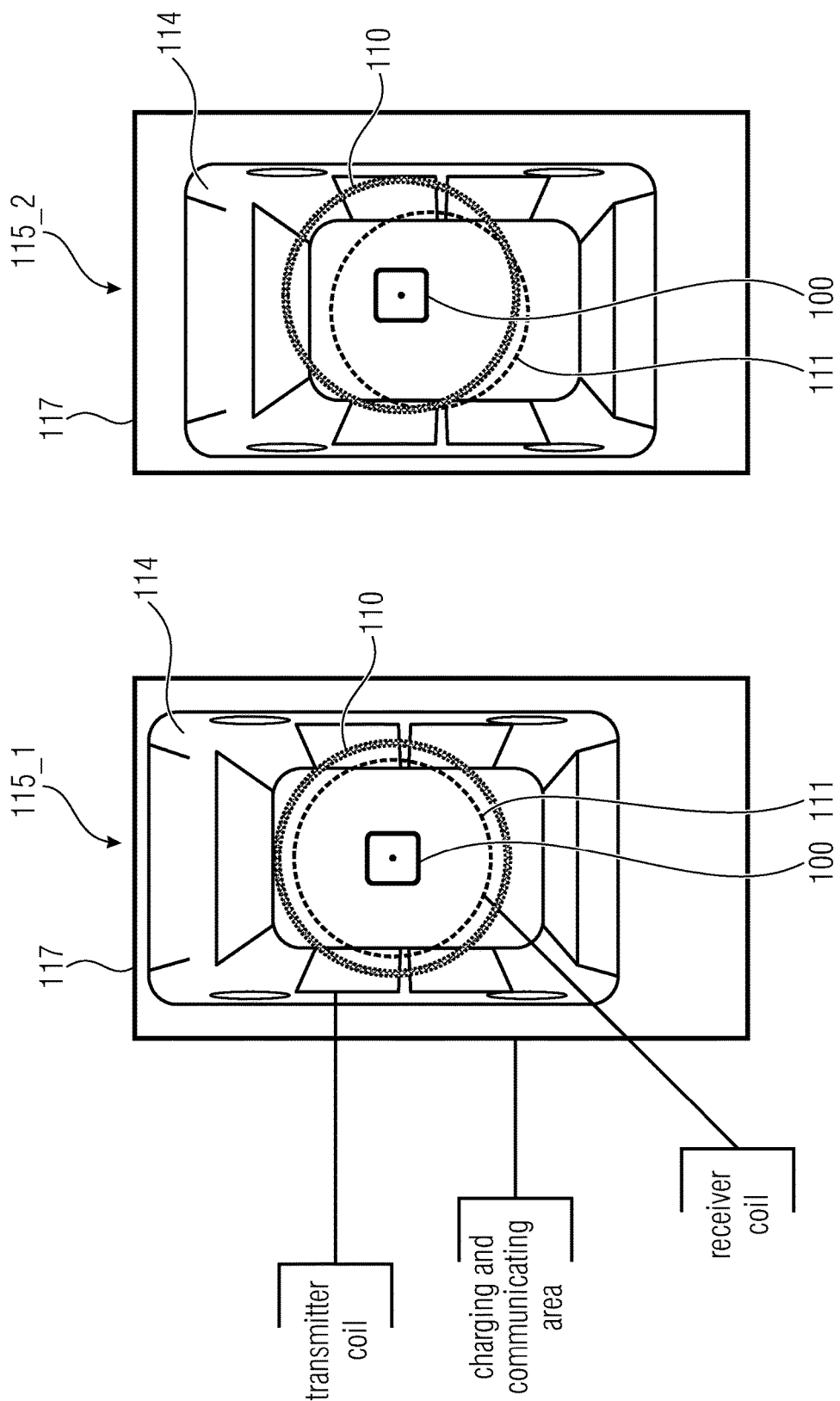
FIG. 1b is a schematic view of a vehicle with correct positioning and incorrect positioning on a charging device with a conductor loop array for charging the vehicle.

FIG. 1b shows a schematic view of a vehicle 114 with correct positioning 115_1 and incorrect positioning 115_2 on a charging device 117 with a conductor loop array 110 for charging the vehicle. The conductor loop array 110 (transmitter conductor loop array) can be incorporated or integrated, for example, in a floor of the charging device and the charging area 117. The vehicle 114 can also comprise a conductor loop array (receiver conductor loop array) 111, wherein energy transmission can take place from the charging area to the vehicle 114 via the conductor loop arrays 110 and 111. When the conductor loop arrays 110 and 111 are not correctly positioned (115_2), i.e., do not cover each other completely, energy transmission and hence charging an electric energy storage of the vehicle 114 is reduced or impossible due to the non-optimum coupling between the conductor loop arrays 110 and 111.

The measuring system 100 shown in FIG. 1a can be used for positioning the vehicle on the charging device 117. For this, the receiver coil array 102 of the measuring system 110 can be positioned, for example, at a predetermined position relative to the receiver coil array 111 or at a geometric centroid and center of the receiver coil array 111, respectively. Based on the fine position information determined by the evaluation means, it can now be determined whether the vehicle is positioned correctly 115_1 or incorrectly 115_2.

Embodiments solve the object of localizing the position of a mobile conductor loop array and mobile coil (e.g., charging coil in an electric car) 111, respectively, as part of an inductively coupled charging system in relation to the stationary primary coil 110 and to derive therefrom control information for the movement of the mobile coil 111 (vehicle) in order to maneuver the mobile coil 111 in the position that is optimum for charging and/or communicating. FIG. 1b shows such a system with a transmitter coil 110 and a receiver coil 111 mounted on a mobile vehicle 114 (opposite thereto on a parallel plane), positioned to one another in an optimum manner (on the left) 115_1 and in a non-optimum manner (on the right) 115_2. If this is no inductive charging system, but, for example, a contact charging system, control information for an automatic coupling system can still be obtained via a respective coil system. Generally, data for positioning such systems can be obtained at short range (maximum of several meters).

Embodiments allow a determination where a receiver coil is located with regard to the transmitter coil 110. When several receiver coils exist, the alignment of the receiver system to a transmitter coil 110 can be determined from a known orientation of these receiver coils to one another and the signals received by the same. With the obtained signals, positioning of the transmission system to one another can be optimized. Since the determined values can be directly converted in position indications, this method is more exact than position control based on signal strength measurements since additional information of the position are determined.

Thus, the solution is comprised of two partial aspects. On the one hand, evaluating the phase jump in the z component of a sensor coil of the receiver coil array when crossing a transmitter coil (ground coil) 110 in combination with unbalanced transmitter signals 106 for clear differentiation between the inside and outside of the transmitter coil 110. This principle is extended by using a 3D receiver coil 102. On the other hand, by evaluating the receiver field strengths in a 3D receiver coil 102, a directional vector to the field source (ground coil 110) can be determined. If several vectors of such 3D receiver coils 102 are combined, positioning indications can be generated therefrom.

In the following, the mode of operation of the measuring device shown in FIG. 1a will be described in detail.

If an electric alternating signal, e.g., a sinusoidal or triangular current signal 106, is directed through a conductor loop array 110 (e.g., a transmitter coil or first coil), a magnetic alternating field 108, which can be received by a receiver conductor loop array (e.g., a receiver coil or second coil) 111, results in a near field around this conductor loop array 110. The current position can be determined by analyzing the received signal (magnetic field component signal), since the phase of the received signal comprises a shift, i.e., is rotated by 180° as shown in FIG. 2 when passing or crossing over the conductor loop array 110 (transmitter coil).

Figure 2:
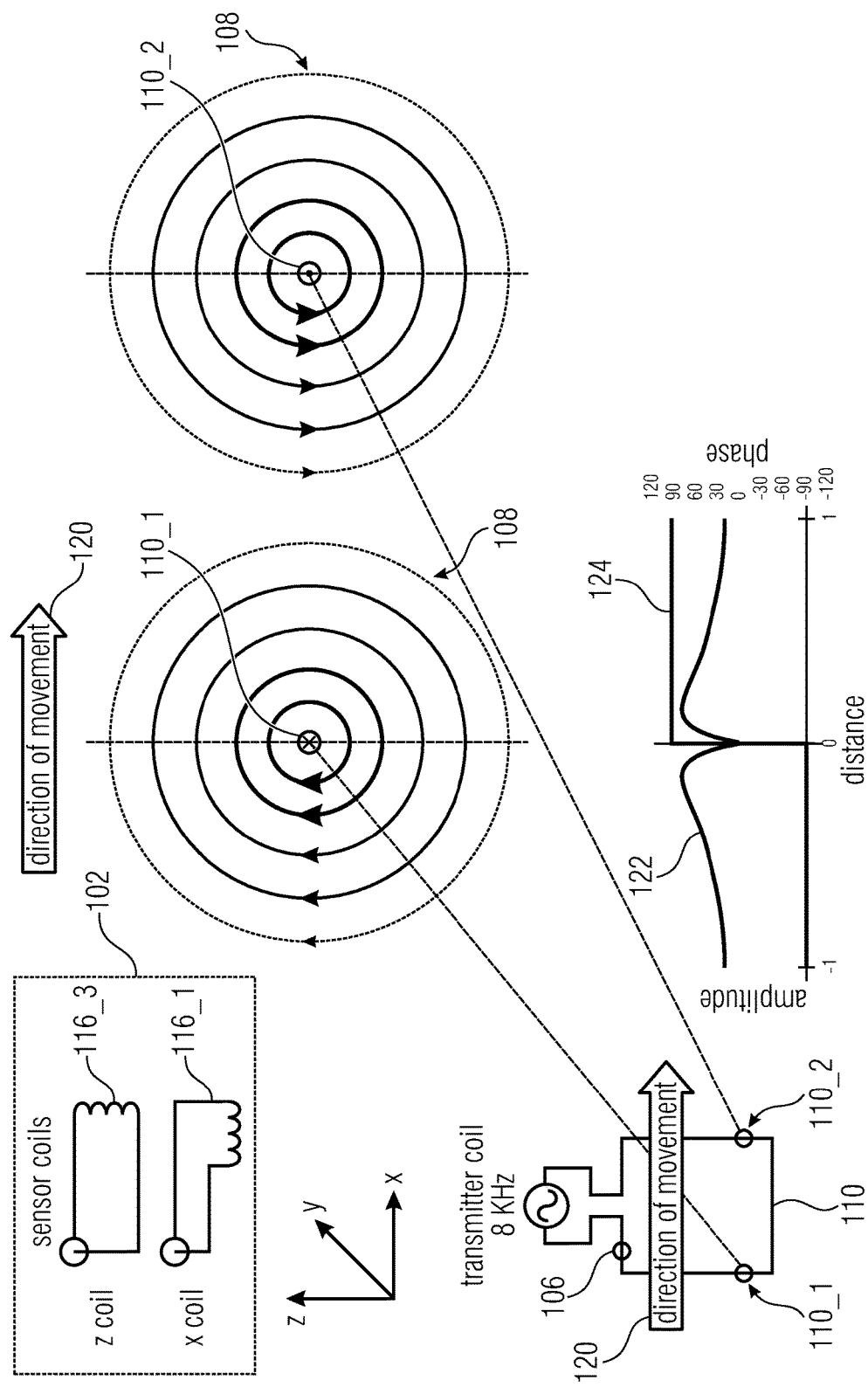
FIG. 2 is a schematic view of a conductor loop array and a receiver coil array with a z coil as well as in a diagram a curve of the magnetic field component signal of the z coil when the receiver coil array, with the z coil, crosses a first conductor region of the conductor loop array along the direction of movement shown in FIG. 2.

FIG. 2 shows a schematic view of a conductor loop array 110 and a receiver coil array 102 with a z coil 116_3 as well as in a diagram a curve of the magnetic field component signal of the z coil 116_3 when the receiver coil array 102 crosses a first conductor region 110_1 with the z coil 116_3 of the conductor loop array 110 along the direction of movement 120 shown in FIG. 2. In the diagram, the ordinate describes both amplitude 122 and phase 124 of the magnetic field component signal of the z coil 116_3 while the abscissa describes the normalized distance in x direction of the receiver coil array 102 to the conductor region 110_1 of the conductor loop array 110. FIG. 2 further shows sectional views of the first conductor region 110_1 of the conductor loop array 110 as well as a second conductor region 110_2 of the conductor loop array 110 together with field lines 108 of the magnetic field generated by a current flow through the first and second conductor regions 110_1 and 110_2.

It follows from the diagram in FIG. 2 that the magnetic field component signal of the z coil 116_3 comprises a phase jump in the moment when the z coil 116_3 crosses the first conductor region 110_1 of the conductor loop array 110. In detail, the magnetic field component signal of the z coil 116_3 comprises the phase jump when a projection of the coil area (e.g., active area and sensor area) of the z coil 116_3 is orthogonal to the first conductor loop region 110_1 of the conductor loop array 110.

When the receiver coil array 102 is moved further along the direction of movement 120, the magnetic field component signal of the z coil 116_3 has a further phase jump when the z coil 116_3 crosses the second conductor region 110_2 of the conductor loop array 110.

Figure 3:
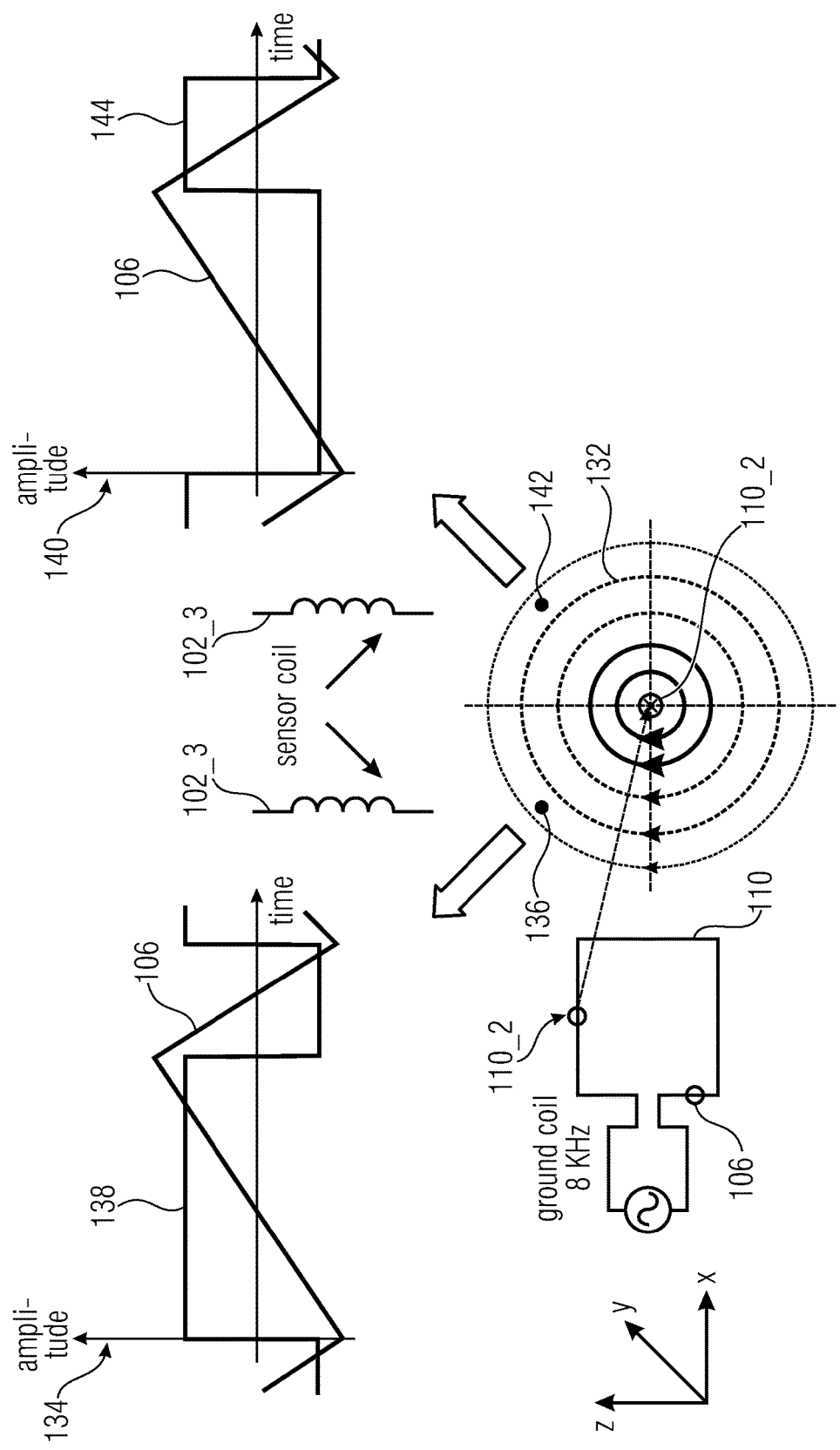
FIG. 3 is a schematic view of the conductor loop array, a cross-section of the current carrying second conductor region of the conductor loop array together with field lines of the magnetic field generated by an unbalanced alternating current signal, as well as in a first diagram a curve of a voltage induced at a first position of the receiver coil array into the z coil plotted over time and in a second diagram a curve of a voltage induced at a second position of the receiver coil array into the z coil plotted over time.

FIG. 3 shows a schematic view of the conductor loop array 110, a cross-section of the current-carrying second conductor region 110_2 of the conductor loop array 110 together with field lines 108 of the magnetic field generated by the current-carrying conductor region 110_2 of the conductor loop array 110, as well as in a first diagram 134 a curve of a voltage 138 induced at a first position 136 of the receiver coil array 102 into the z coil 116_3 plotted over time, and in a second diagram 140 a curve of a voltage induced at a second position 142 of the receiver coil array 102 into the z coil 116_3 plotted over time. Further, in the first diagram 134 and the second diagram 140, a curve of the current 106 through the second conductor region 110_2 of the conductor loop array 110 is shown.

As can be seen in FIG. 3, depending on the position 136 and 142 of the z coil 116_3, which is aligned in z direction, relative to the current-carrying conductor region 110_2 of the conductor loop array 110 a different characteristic voltage 138 and 144 is induced in the z coil 116_3 when, for example, an unbalanced signal (alternating current signal) 106, such as a triangular signal, is used. A possible evaluation method in a circuit is measuring the time between rising and falling edges of the voltage curves 138 and 144 of the voltages induced in the z coil 116_3 shown in FIG. 3.

Further, it is possible to route signals via a Schmitt trigger and subsequently make a unique allocation of the coil signal to a conductor side by integrating the induced coil signal (magnetic field component signal) and a comparison with an average value of the received signal, since due to the phase jump on the one side of the conductor region 110_2 (e.g., first position 136) a smaller integration value than on the other side of the conductor region 110_2 (e.g., second position 142) results.

Thus, the measuring device 100 can additionally evaluate the amplitude of the magnetic field component signal (receiver signal) 112. In an unbalanced signal shape of the current 106 running through the conductor loop array 110 (ground coil), this position information can be determined without knowing the previous position of the receiver coil arrangement (sensor coil) 102 merely based on the induced voltage. The respective signals are illustrated in FIG. 3.

Contrary to embodiments of the present invention, two states can be determined with the system known from DE 10 2013 214 238, namely "inside/outside" with respect to the conductor loop. The structure of the system described there allows also the detection of a third state, "above the limit". This state results as a limit state when passing or crossing from inside to outside or vice versa, since there both sides cancel each other in their signal portions of the z component. For clearly detecting this state, however, several orthogonal coils have to be used or, in addition to the phase, the signal strength has to be sampled. Here, the system assumes that the current flow is rotated neither by the transmitter coil nor by the sensor coil, since this would change the allocation of the states. However, this can be prevented on the side of the sensor coil by additional position sensors or can be considered accordingly in the evaluation.

By contrast, the combination of the technical effects described below is used in embodiments.

Figure 4A:
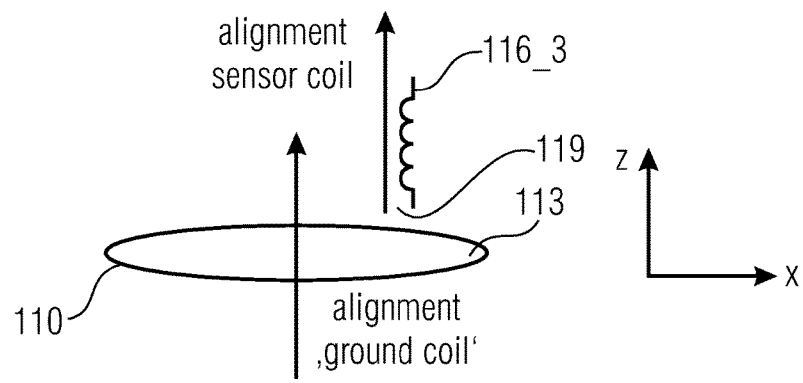
FIG. 4a is a schematic view of the conductor loop array and the z coil of the receiver coil array.

FIG. 4a shows a schematic view of the conductor loop array (ground coil) 110 and the z coil 116_3 of the receiver coil array 102. As can be seen in FIG. 4a, the conductor loop area 113 of the conductor loop array 110 and the coil area 119 of the z coil 116_3 are aligned parallel to one another. Here, the conductor loop area 113 of the conductor loop array 110 is within a plane that is spanned by the conductor loop array 110 and is limited by the conductor loop array 110. The coil area 119 of the z coil 116_3 is within a plane that is spanned by the z coil 116_3 and is limited by the z coil 116_3. In other words, the conductor loop array 110 and the z coil 116_3 are arranged along directions which run parallel to the z axis.

Figure 4B:
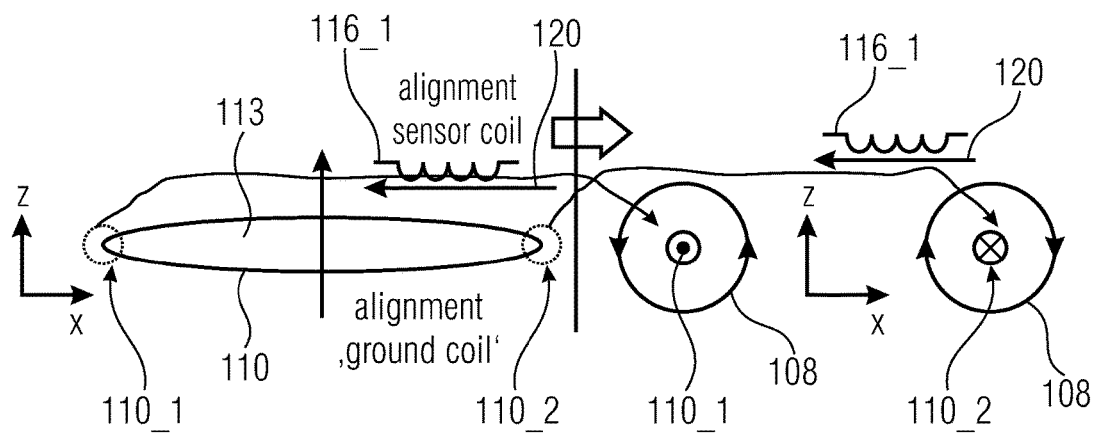
FIG. 4b is a schematic view of the conductor loop array, the x coil of the receiver coil array, cross-sections of the first and second current-carrying conductor region of the conductor loop array as well as field lines of the magnetic field caused by the current flow through the first conductor region and the second conductor region.

FIG. 4b shows a schematic view of the conductor loop array 110, the x coil 116_1, the receiver coil array 102, cross-sections of the first and second current-carrying conductor region 110_1 of the conductor loop array as well as field lines 108 of the magnetic field which is caused by the current flow through the first conductor region 110_1 and the second conductor region 110_2. In other words, FIG. 4b shows on the left side the new perpendicular alignment (x, y alignment) and on the right side an enlargement. Here exists an option for side allocation by the phase jump of the magnetic field component signals of the x coil 116_1 and the y coil 116_2. For the following explanations, it is assumed exemplarily that the x coil 116_1 of the receiver coil array 102 is moved along a direction of movement 120 that runs anti-parallel to the x axis.

Thus, it follows from FIG. 4a in combination with FIG. 2 that when the two coil areas of ground coil (transmitter) 110 and sensor coil (receiver, e.g., z coil 116_3) are arranged parallel to one another, the phase jump occurs when moving the receiver coil (e.g., z coil 116_3) from outside to inside or from inside to outside of the conductor loop array (transmitter coil) 110.

If, however, the receiver coil area is arranged orthogonally to the conductor loop area (transmitter coil area), as is the case, for example, in the x coil 116_1 and shown in FIG. 4b, the phase jump occurs when passing over the conductor loop array (transmitter coil) 110 when the receiver coil (e.g., x coil 116_1) leaves the sphere of influence of the one side (e.g., to the right of the geometric center and centroid, respectively, of the conductor loop array and flow coil 110, respectively) of the conductor loop array (transmitter coil) 110 and enters the sphere of influence of the other side (e.g., to the left of the geometric center and centroid, respectively, of the conductor loop array and ground coil 110, respectively). During this movement, also, passing and crossing, respectively, of the center (geometric center and centroid, respectively) of the conductor loop array 110) can be detected since the signals of the two sides cancel each other.

If these considerations are combined and a third coil (e.g., y coil 116_2) is added, which is perpendicular to the other two (3D coil), an arrangement results that detects three states in x, y and z direction, which allows, for example, in a circular conductor loop array (ground coil) a division into theoretically 27, practically 26 different areas as will be discussed below.

FIG. 5a shows a schematic view of 3 x coarse regions 152_x0 to 152_x2 of a positioning area 151 that the measuring device 100 can determine based on the magnetic field component signal of the x coil 116_1.

The positioning area 151 (limited by the ring 150 in FIG. 5a) that can be allocated to the conductor loop array 110 can run parallel to a conductor loop plane that is spanned by the conductor loop array 110. Here, the positioning area can be of the same size or greater than the conductor loop area 130 which is within the conductor loop plane and limited by the conductor loop array 110.

In embodiments, the evaluation means 104 can be configured to evaluate the magnetic field component field signal of the x coil 116_1 for determining a phase relation between the magnetic field component signal of the x coil 116_1 and the electric alternating current signal. Here, the phase relation can comprise coarse position information of the x coil 116_1 relative to the conductor loop array 110 as will be discussed below.

When the x coil 116_1 crosses the conductor loop array 110 completely in x direction, the phase relation between the magnetic field component signal of the x coil 116_1 and the electric alternating current signal 106 comprises a phase jump when the x coil 116_1 crosses the geometric center and centroid, respectively, of the conductor loop array 110. Prior to the occurrence of the phase jump, the phase relation comprises a first phase, whereas after the occurrence of the phase jump, the phase relation comprises a second phase.

Accordingly, the phase relation between the magnetic field component signal of the x coil 116_1 and the electric alternating current signal 106 can assume three different states depending on the position of the x coil 116_1 relative to the conductor loop array 110, namely a phase jump (state 0), a first phase (state 1), e.g., −90° and a second phase (state 2), e.g., +90°. Thus, the phase relation comprises coarse position information which indicates, depending on the current phase relation between the magnetic field component signal of the x coil 116_1 and the electric alternating current signal 106, one of three possible x coarse regions 152_*x*1 to 152_*x*3, wherein the three possible x coarse regions 152_*x*1 to 152_*x*3 do not overlap and intersect, respectively.

Analogously, FIG. 5*b* shows a schematic view of three y coarse regions 152_*y*0 to 152_*y*2 of the positioning area 151 that the measuring means 100 can determine based on the magnetic field component signal of they coil 116_2, while FIG. 5*c* shows a schematic view of three z coarse regions 152_*z*0 to 152_*z*2 of the positioning area 151 that the measuring means 100 can determine based on the magnetic field component signal of the z coil 116_3.

Figure 6A:
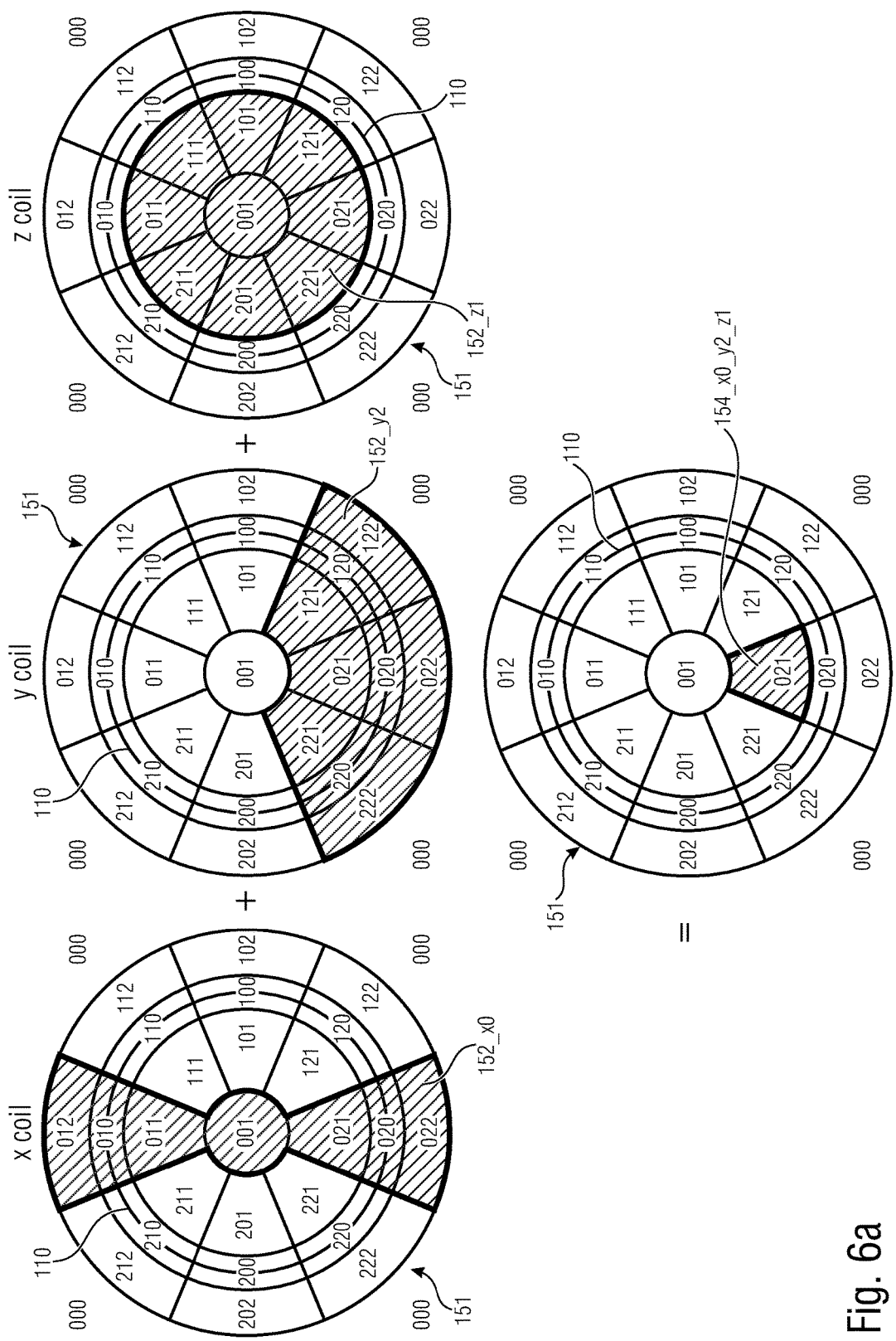
FIG. 6a shows in a schematic view, coarse regions that are indicated by the coarse position information of the phase relations of the magnetic field component signals of the x coil, y coil and z coil, as well as a fine region resulting from the intersection of the indicated coarse regions.

In a schematic view, FIG. 6*a* shows coarse regions that are indicated by the coarse position information of the phase relations of the magnetic field component signals of the x coil 116_1, y coil 116_2 and z coil 116_3 as well as a fine region resulting from the intersection of the indicated coarse regions.

In FIG. 6*a*, the phase relation between the magnetic field component signal of the x coil 116_1 and the electric alternating current signal 106 comprises a phase jump (state 0), such that the first coarse position information indicates the first x coarse region 152_*x*0. The phase relation between the magnetic field component signal of the y coil 116_2 and the electric alternating current signal 106 comprises a second phase (state 2), such that the second coarse position information indicates the third y coarse region 152_*y*2. The phase relation between the magnetic field component signal of the z coil 116_3 and the electric alternating current signal 106 comprises a first phase (state 1), such that the third coarse position information indicates the second z coarse region 152_*z*1.

The indicated coarse regions 152_*x*0, 152_*y*2 and 152_*z*1 overlap in the fine region 154_*x*0_*y*2_*z*1. The fine region 154_*x*0_*y*2_*z*1 indicates the position of the receiver coil array 102 relative to the conductor loop array 110.

Figure 6B:
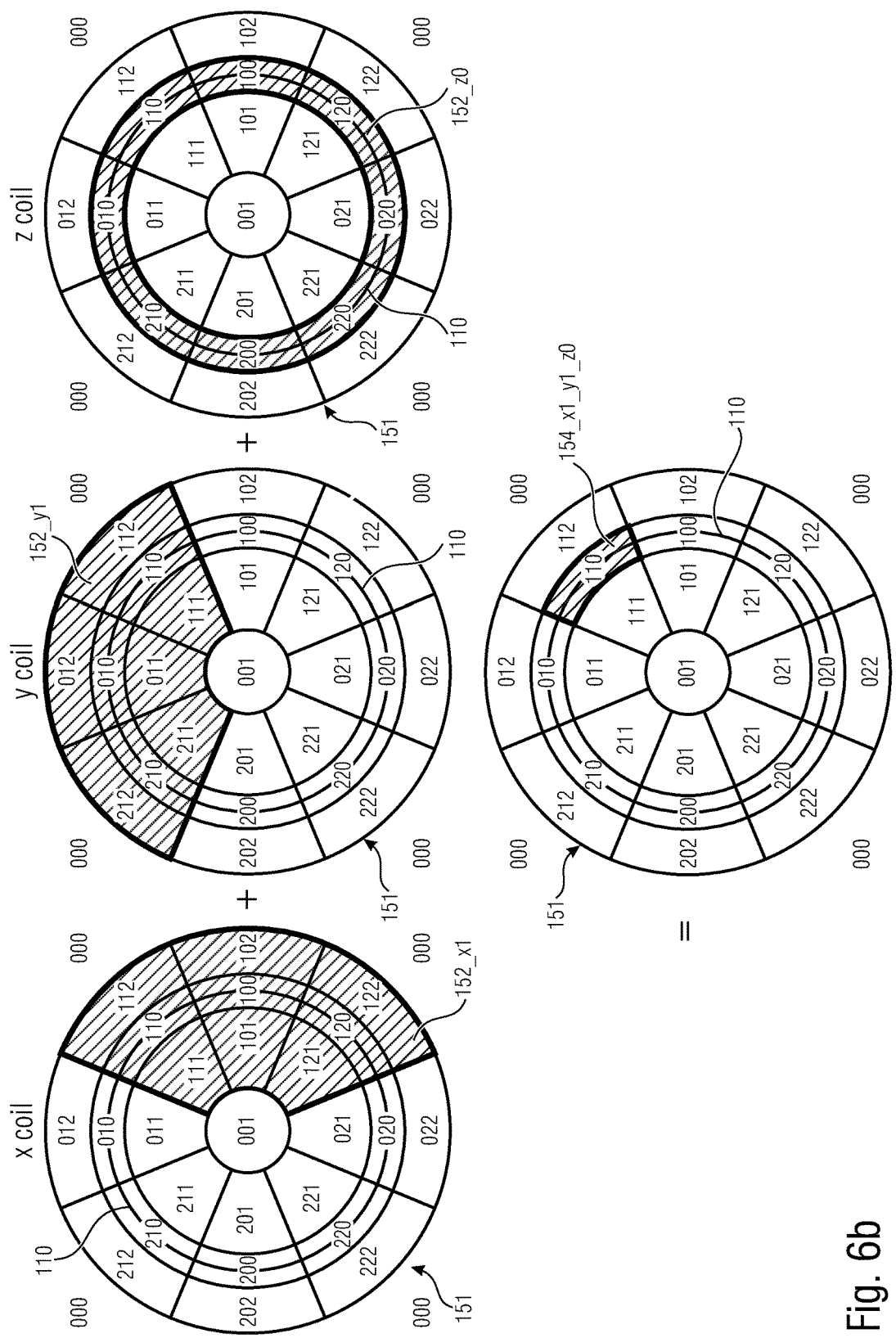
FIG. 6b shows in a schematic view, coarse regions that are indicated by the coarse position information of the phase relations of the magnetic field component signals of the x coil, y coil and z coil, as well as a fine region resulting from the intersection of the indicated coarse regions.

In a schematic view, FIG. 6*b* shows coarse regions indicated by the coarse position information of the phase relations of the magnetic field component signals of the x coil 116_1, y coil 116_2 and z coil 116_3, as well as a fine region resulting from the intersection of the indicated coarse regions.

In FIG. 6*b*, the phase relation between the magnetic field component signal of the x coil 116_1 and the electric alternating current signal 106 comprises a first phase (state 1), such that the first coarse position information indicates the second x coarse region 152_*x*1. The phase relation between the magnetic field component signal of the y coil 116_2 and the electric alternating current signal 106 comprises a first phase (state 1), such that the second coarse position information indicates the second y coarse region 152_*y*1. The phase relation between the magnetic field component signal of the z coil 116_3 and the electric alternating current signal 106 comprises a phase jump (state 0), such that the third coarse position information indicates the first z coarse region 152_*z*0.

The indicated coarse regions 152_*x*1, 152_*y*1 and 152_*z*1 overlap in the fine region 154_*x*1_*y*1_*z*0. The fine region 154_*x*1_*y*1_*z*0 indicates the position of the receiver coil array 102 relative to the conductor loop array 110.

Figure 6C:
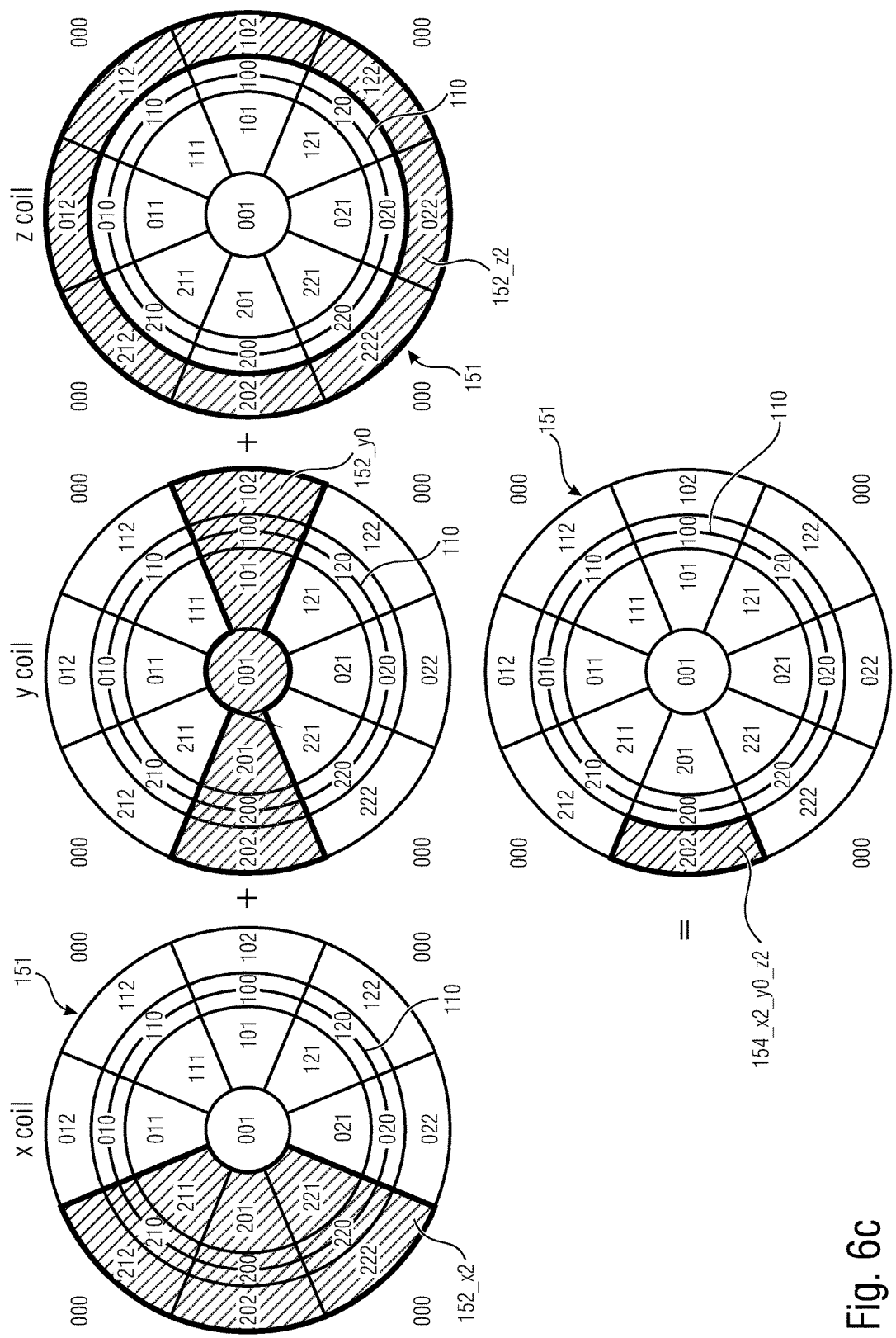
FIG. 6c shows in a schematic view, coarse regions that are indicated by the coarse position information of the phase relations of the magnetic field component signals of the x coil, y coil and z coil, as well as a fine region resulting from the intersection of the indicated coarse regions.

In a schematic view, FIG. 6*c* shows coarse regions that are indicated by the coarse position information of the phase relations of the magnetic field component signals of the x coil 116_1, y coil 116_2 and the z coil 116_3 as well as a fine region resulting from the intersection of the indicated coarse regions.

In FIG. 6*c*, the phase relation between the magnetic field component signal of the x coil 116_1 and the electric alternating current signal 106 comprises a second phase (state 2), such that the first coarse position information (or x coarse position information) indicates the third x coarse region 152_*x*2. The phase relation between the magnetic field component signal of the y coil 116_2 and the electric alternating current signal 106 comprises a phase jump (state 0), such that the second coarse position information (or y coarse position information) indicates the second y coarse region 152_*y*0. The phase relation between the magnetic field component signal of the z coil 116_3 and the electric alternating current signal 106 comprises a second phase (state 2), such that the third coarse position information (or z coarse position information) indicates the third z coarse region 152_*z*2.

The indicated coarse regions 152_*x*2, 152_*y*0 and 152_*z*2 overlap in the fine region 154_*x*2_*y*0_*z*2. The fine region 154_*x*2_*y*0_*z*2 shows the position of the receiver coil array 102 relative to the conductor loop array 110.

Figure 7:
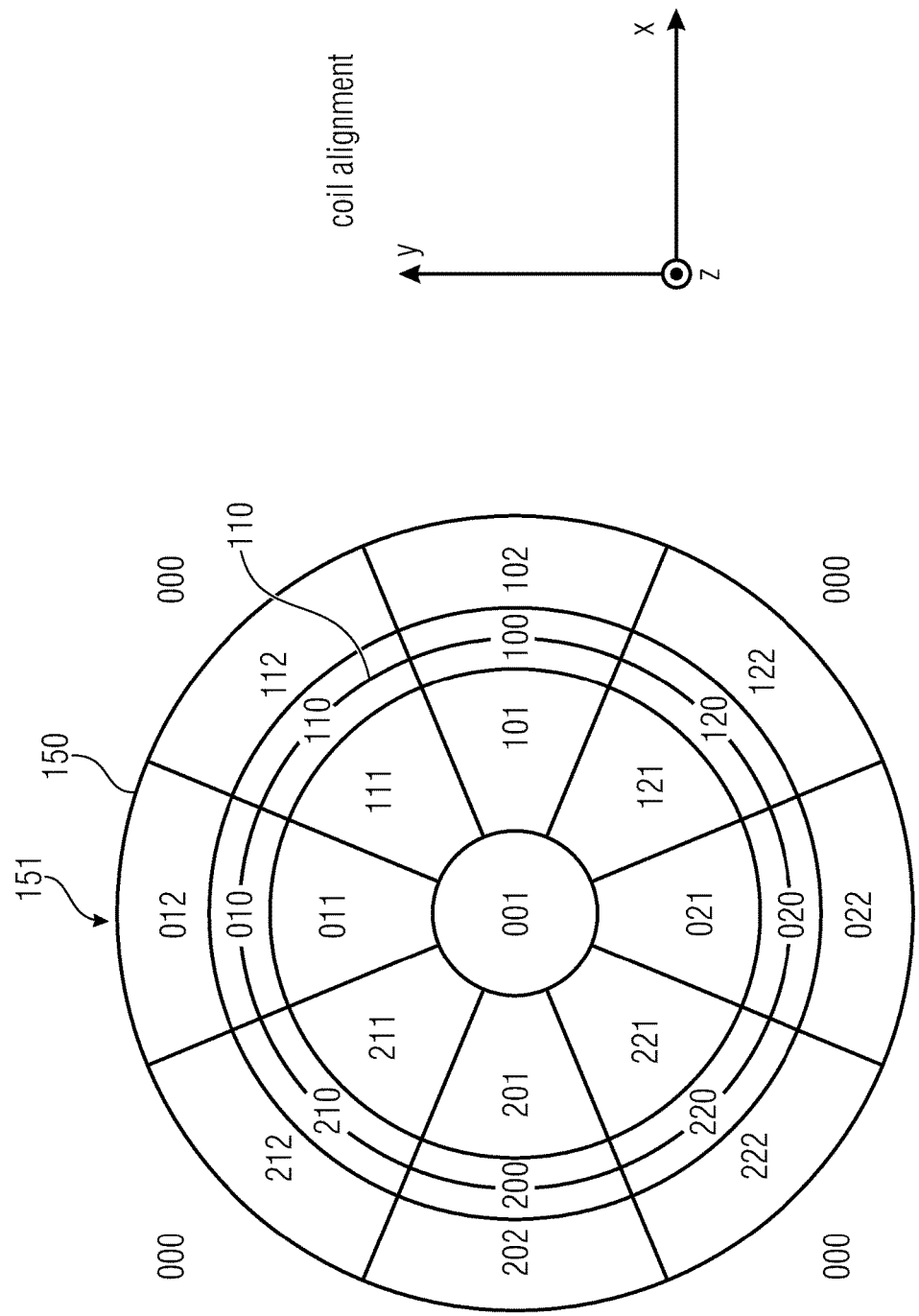
FIG. 7 is a schematic view of the conductor loop array as well as the positioning area limited by a circle and allocated to the conductor loop array.

FIG. 7 shows a schematic view of the conductor loop array 110 as well as the positioning area 151 which is limited by the circle 150 and allocated to the conductor loop array 110. In other words, FIG. 7 shows the individual fields and sections and sectors, respectively, in an example with a circular conductor loop array (ground coil) 110. Due to the superposition of the coarse regions indicated by the coarse position information which can be inferred from the phase relations between the three magnetic field components signals 112 and the electric alternating current signal 106, the 26 possible fine regions shown in FIG. 7 result. Theoretically, 27 different fine regions are possible but state 002 does not appear in a real setup.

As can be seen in FIG. 7, each of the fine regions can be described by a three-digit state. The first digit of the three-digit state indicates the coarse position information of the x coil 116_1, while the second digit of the three-digit state indicates the coarse position information of the y coil 116_2 and while the third digit of the three-digit state indicates the coarse position information of the z coil 116_3. Each digit of the three-digit state can here assume the values 0, 1 or 2. The possible states are summarized in the subsequent table:

| State | x coil | y coil | z coil |
|---|---|---|---|
| 0 | undefined | undefined | undefined |
| 1 | right | top | inside |
| 2 | left | bottom | outside |

Thus, FIG. 7 shows the distinguishable states when a 3D sensor coil 102 is moved over the conductor loop array (ground coil) 110. The state 0 and undefined, respectively, refers to the position where the indications of direction that can be determined from the unbalanced transmission signal just cancel each other and hence result in an undefined state which can also be detected and evaluated as such. This applies in particular since here, no decision can be made based on the magnetic field component signal but the magnetic field component signal itself can be detected. If all three coils of the 3D sensor coil 102 indicate this state, this means that this sensor coil 102 is outside the signal range of the conductor loop array (ground coil) 110, which is indicated by the state 000 in FIG. 7.

If several such receiver coil arrays 102 are additionally integrated in the receiver side of a coil system, where the mutual coverage is to be maximized, and the respective signal is transmitted on the other side, this principle can be applied several times.

Additionally, by field strength measurements at the 3D sensor coils 110 with a certain accuracy (depending on the number and position of the sensor coils), the current positioning of the system coils 110 and 111 to one another can be inferred and respective correction data for positioning the transmission system can be obtained. Additionally, additional sensor coils can be added to the system of FIG. 1b which can be evaluated by the evaluation means according to device 100.

Figure 8A:
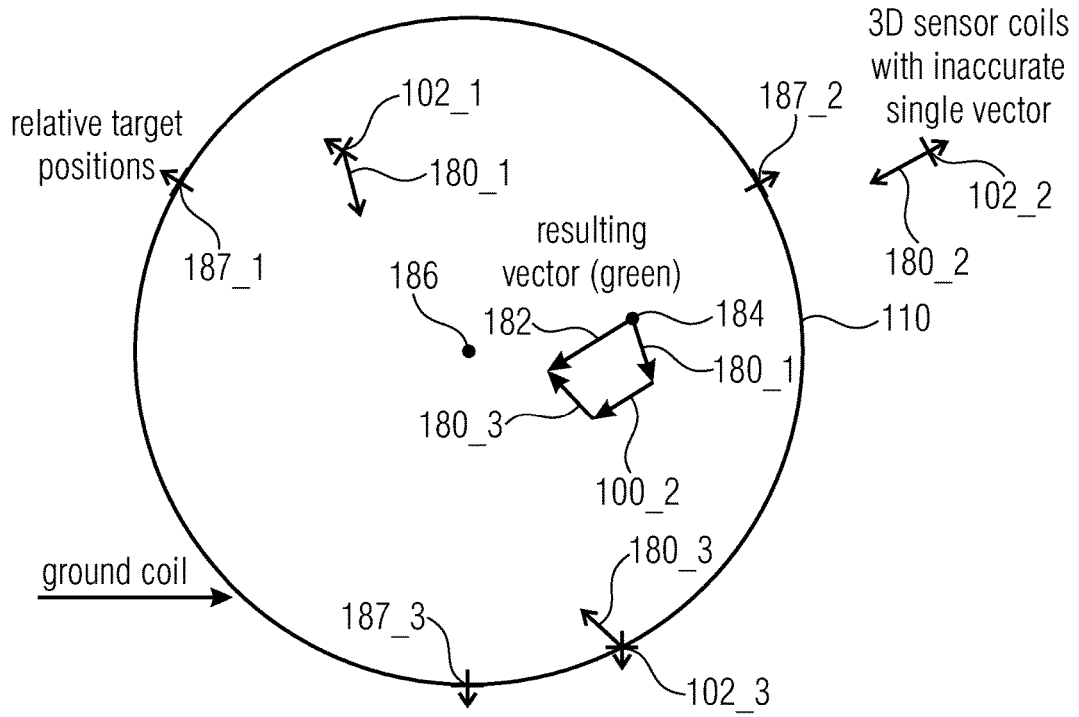
FIG. 8a is a schematic view of a conductor loop array and a measuring device with three receiver coil arrays.

FIG. 8a shows a schematic view of a conductor loop array 110 and a measuring device 100 having three receiver coil arrays 102_1 to 102_3. The evaluation of the magnetic field component signals of the two further receiver coil arrays 102_2 and 102_3 by the evaluation means is performed analogously to the evaluation of the receiver coil array 102_1.

In embodiments, directional information can be allocated to the fine regions 154 of the positioning area, which indicate the geometric centroid and center, respectively, of the conductor loop array 110, wherein the evaluation means 104 can be configured to output a directional signal, which indicates and shows, respectively, an estimated direction to the geometric centroid of the conductor loop array 110, based on the directional information allocated to the fine region resulting from the intersection of the indicated coarse regions.

With reference to FIG. 8a, the evaluation means 102 can accordingly determine first directional information 180_1 based on the magnetic field component signals of the first receiver coil array 102_1, second directional information 180_2 based on the magnetic field component signals of the second receiver coil array 102_2 and third directional information 180_3 based on the magnetic field component signals of the third receiver coil array 102_3. These three pieces of directional information 180_1, 180_2, and 180_3 can be combined to obtain resulting directional information 182 as shown in FIG. 8a. The resulting directional information 182 can point from a current position 184 of the measuring device to the geometric center and centroid 186, respectively, of the conductor loop array 110. Here, the current position 184 can be a geometric centroid and center, respectively, of a (receiver) conductor loop array 111 of a vehicle, wherein the three receiver coil arrays 102_1 to 102_3 of the measuring device 100 can be arranged at equal intervals (equidistant) to the geometric center and centroid, respectively, of the (receiver) 184 conductor loop array 111.

Further, in FIG. 8a, exemplarily, relative target positions 187_1 to 187_3 of the receiver coil arrays 102_1 to 102_3 are marked. Current positions of the receiver coil arrays 102_1 to 102_3 correspond to the relative target positions 187_1 to 187_3 when the current position 184 of the measuring device e.g., the geometric center and centroid, respectively, of the (receiver) conductor loop array 111 corresponds to the geometric center and centroid 186, respectively, of the conductor loop array 110.

Figure 8B:
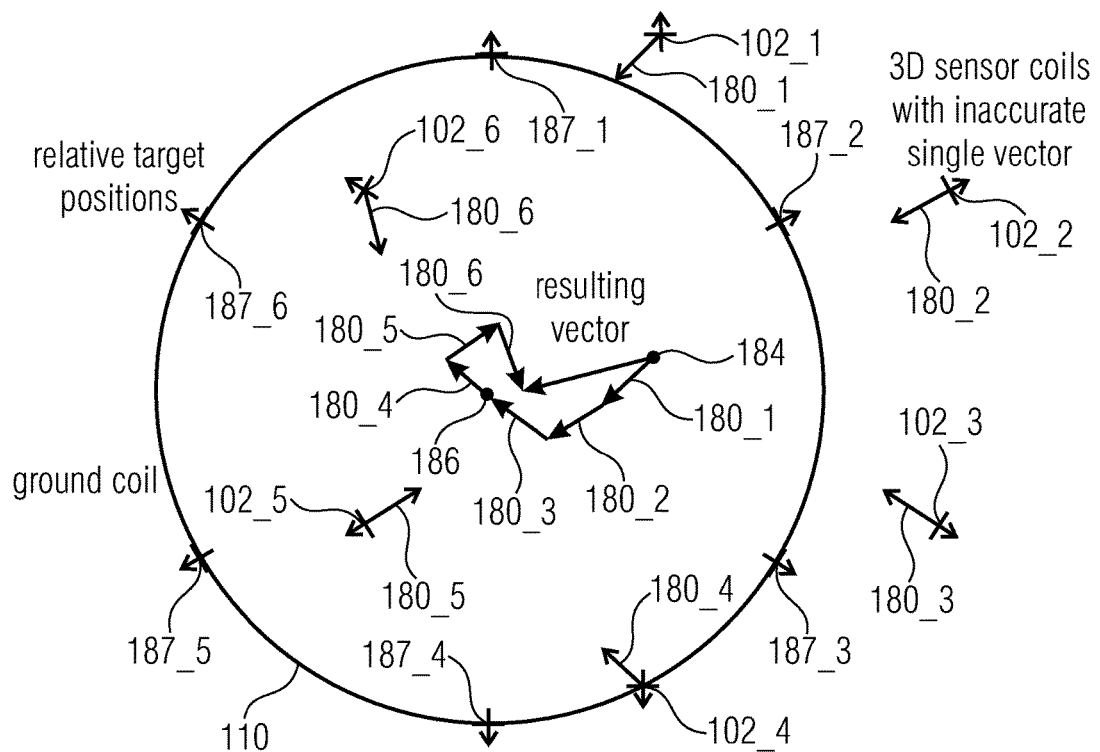
FIG. 8b is a schematic view of a conductor loop array and a measuring device with three receiver coil arrays.

FIG. 8b shows a schematic view of a conductor loop array 110 and a measuring device 100 having six receiver coil arrays 102_1 to 102_6. Here, the evaluation means 102 can determine first directional information 180_1 based on the magnetic field component signals of the first receiver coil array 102_1, second directional information 180_2 based on the magnetic field component signals of the second receiver coil array 102_2, third directional information 180_3 based on the magnetic field component signals of the third receiver coil array 102_3, fourth directional information 180_4 based on the magnetic field component signals of the fourth receiver coil array 102_4, fifth directional information 180_5 based on the magnetic field component signals of the fifth receiver coil array 102_5, and sixth directional information 180_6 based on the magnetic field component signals of the sixth receiver coil array 102_6. The six pieces of directional information 180_1 to 180_6 can be combined to obtain resulting directional information 182 as shown in FIG. 8b. Here, the resulting directional information 182 can point from a current position 184 of the measuring device to the geometric center and centroid 186, respectively, of the conductor loop array 110. Here, the current position 184 can be a geometric centroid and center, respectively, of a (receiver) conductor loop array 111 of a vehicle, wherein the three receiver coil arrays 102_1 to 102_6 of the measuring device 100 can be arranged at equal intervals (equidistant) to the geometric center and centroid, respectively, 184 of the (receiver) conductor loop array 111.

Further, in FIG. 8b, exemplarily, relative target positions 187_1 to 187_6 of the receiver coils array 102_1 to 102_6 are marked. Current positions of the receiver coil arrays 102_1 to 102_6 correspond to the relative target positions 171_1 to 187_6 when the current position 184 of the measuring device, for example, the geometric center and centroid, respectively, of the (receiver) conductor loop array 111 corresponds to the geometric center and centroid, 186, respectively, of the conductor loop array 110.

In other words, FIG. 8a shows a large conductor loop array (ground coil) 110 and three receiver coil arrays (sensor coils) 102_1 to 102_2. Here, the conductor loop array 110 emits a position signal. Each of the receiver coil arrays (sensor coils) 102_1 to 102_3 can provide a single vector 180_1 to 180_3, based on phase measurements, relative to the target position (geometric center and centroid 186, respectively of the conductor loop array 110). When these single vectors 180_1 to 180_3 are combined, a directional indication to the correct position 186 results from the resulting vector 182. In the following, it will described how the accuracy of this result which is only based on the phase measurement can be improved.

If a phase and amplitude measurement is performed, the field vector 182 can be determined more accurately. If the number of sensor coils is increased, the accuracy of the resulting vector for position correction will also be increased as shown in FIG. 8b. This evaluation relates only to signal evaluation (amplitude/phase) with 3D sensor coils independent of the signal shape of the transmission signal. If this method is combined with the above described unbalanced signal, the accuracy of positioning can be increased further.

The described system can also be inverted such that the moveable system part emits the positioning signal.

Figure 9:
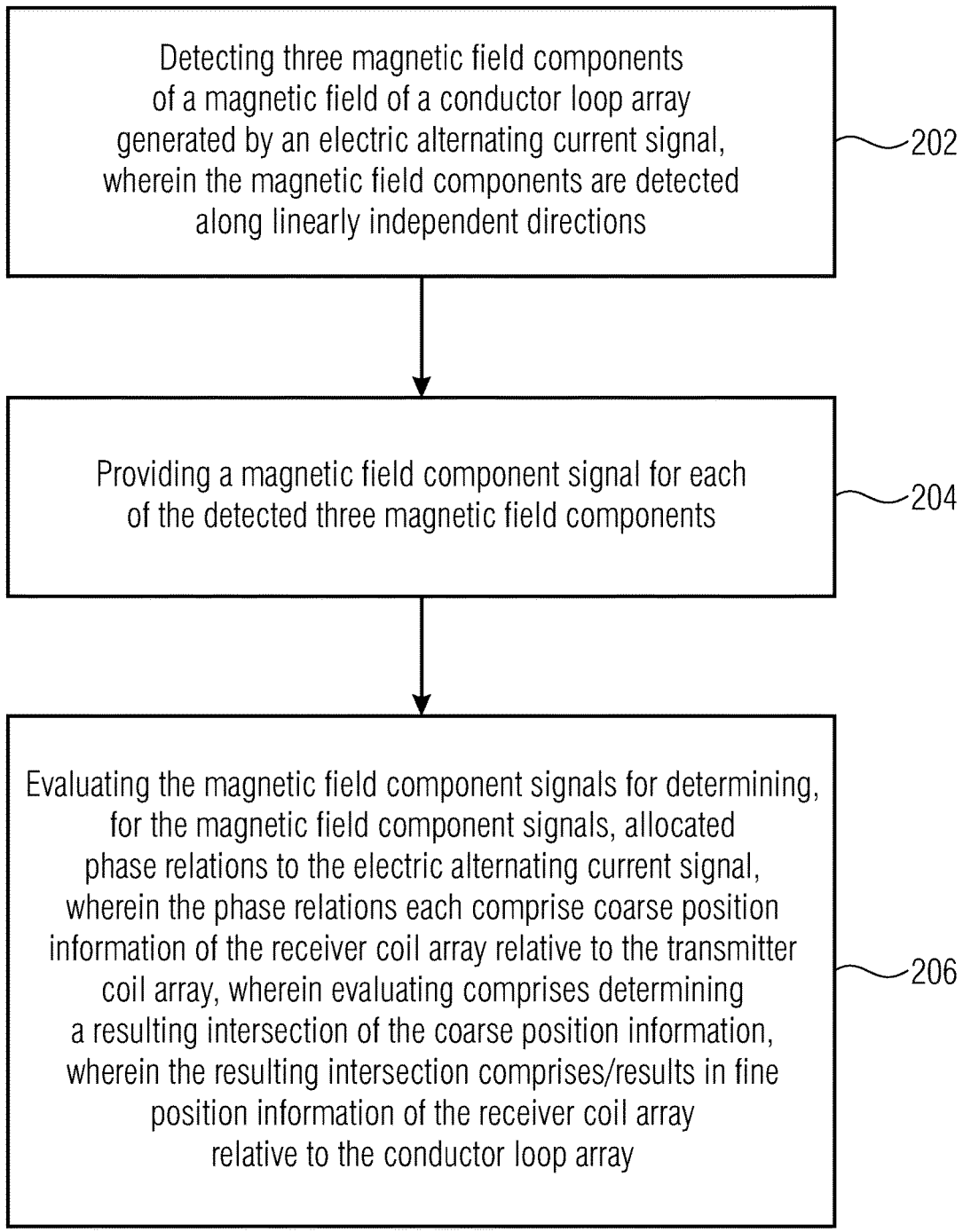
FIG. 9 is a flow diagram of a measuring method according to an embodiment of the present invention.

FIG. 9 shows a flow diagram of a measuring method 200 according to an embodiment of the present invention. The measuring method 200 includes a step 202 of detecting three magnetic field components of a magnetic field of a conductor loop array generated by an electric alternating current signal, wherein the magnetic field components are detected along linearly independent directions; a step 204 of providing a magnetic field component signal for each of the detected three magnetic field components; and a step 206 of evaluating the magnetic field component signals for determining, for the magnetic field component signals, allocated phase relations to the electric alternating current signal, wherein the phase relations each comprise coarse position information of the receiver coil array relative to the transmitter coil array, wherein evaluating comprises determining a resulting intersection of the coarse position information, wherein the resulting intersection comprises/results in fine position information of the receiver coil array relative to the conductor loop array.

As already mentioned, when transmitting data and/or energy by means of coupled coils (conductor loop arrays), exact positioning of the coils involved in the transmission with respect to one another is decisive for efficient and error-free transmission. In the following, a data transmission device will be described where the transmission of data is performed by means of coupled coils (conductor loop arrays). The above-described features can also be applied or transferred to the data transmission device.

Figure 10:
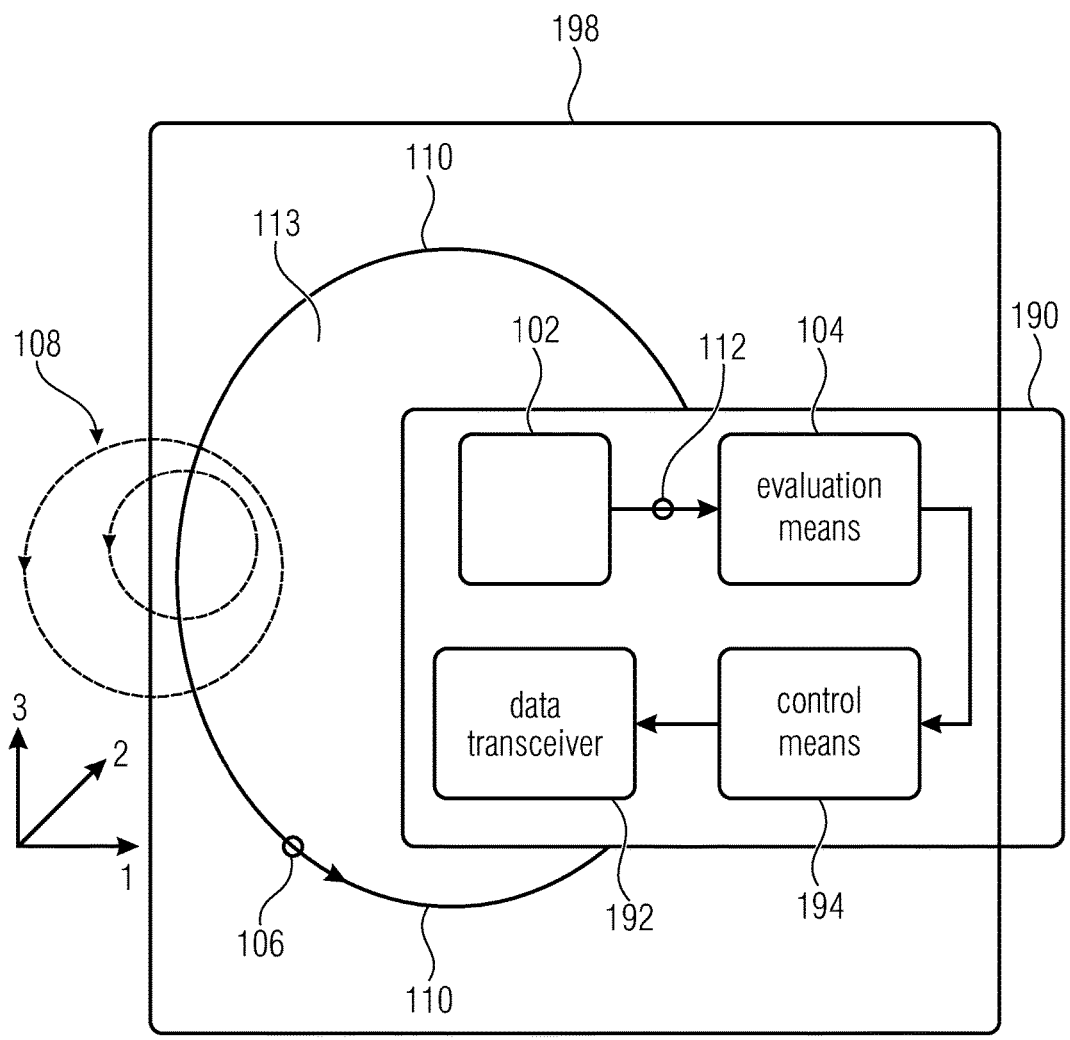
FIG. 10 is a schematic block diagram of a data transmission device according to an embodiment of the present invention.

FIG. 10 shows a schematic block diagram of a data transmission device 119 according to an embodiment of the present invention. The data transmission device comprises a data transceiver 192, a receiver coil array 102, an evaluation means 104 and a control means 194. The receiver coil array 102 is configured to detect at least one magnetic field component of a magnetic field 108 of a conductor loop array 110 generated by an electric alternating current signal 106 of a further data transmission device 198 and to provide a magnetic field component signal 112 for the detected magnetic field component 108. The evaluation means 104 is configured to evaluate the magnetic field component signal 112 for determining a phase relation between the magnetic field component signal 112 and the electric alternating current signal 106, wherein the phase relations comprise position information that indicate whether projection of the receiver coil array 102 is perpendicular to a conductor loop area inside the conductor loop area, wherein the conductor loop area is within a plane that is spanned by the conductor loop array 110, and wherein the conductor loop area is limited by the conductor loop array 110. The control device 194 is configured to enable data transmission of the data transceiver 192 only when the projection of the receiver coil array 110 is perpendicular to the conductor loop area inside or outside the conductor loop area.

In embodiments, the receiver coil array 102 can be configured to detect a magnetic field component of the magnetic field of the conductor loop array that runs orthogonally to the conductor loop array 113. For this, the receiver coil array 102 can comprise, for example, the z coil 116_3.

Obviously, the receiver coil array 102 can also comprise the x coil 116_1 and/or y coil 116_2, wherein the evaluation means 104 can be configured to determine the position of the receiver coil array 102 relative to the conductor loop array 110 further based on the magnetic field component signals of the x coil 116_1 and y coil 116_2. In other words, the data transmission device 190 can comprise the above-described measuring device 100, wherein the control device 194 can be configured to enable, based on the fine position determined by the evaluation means 104, the data transmission of the data transceiver 192.

Figure 11:
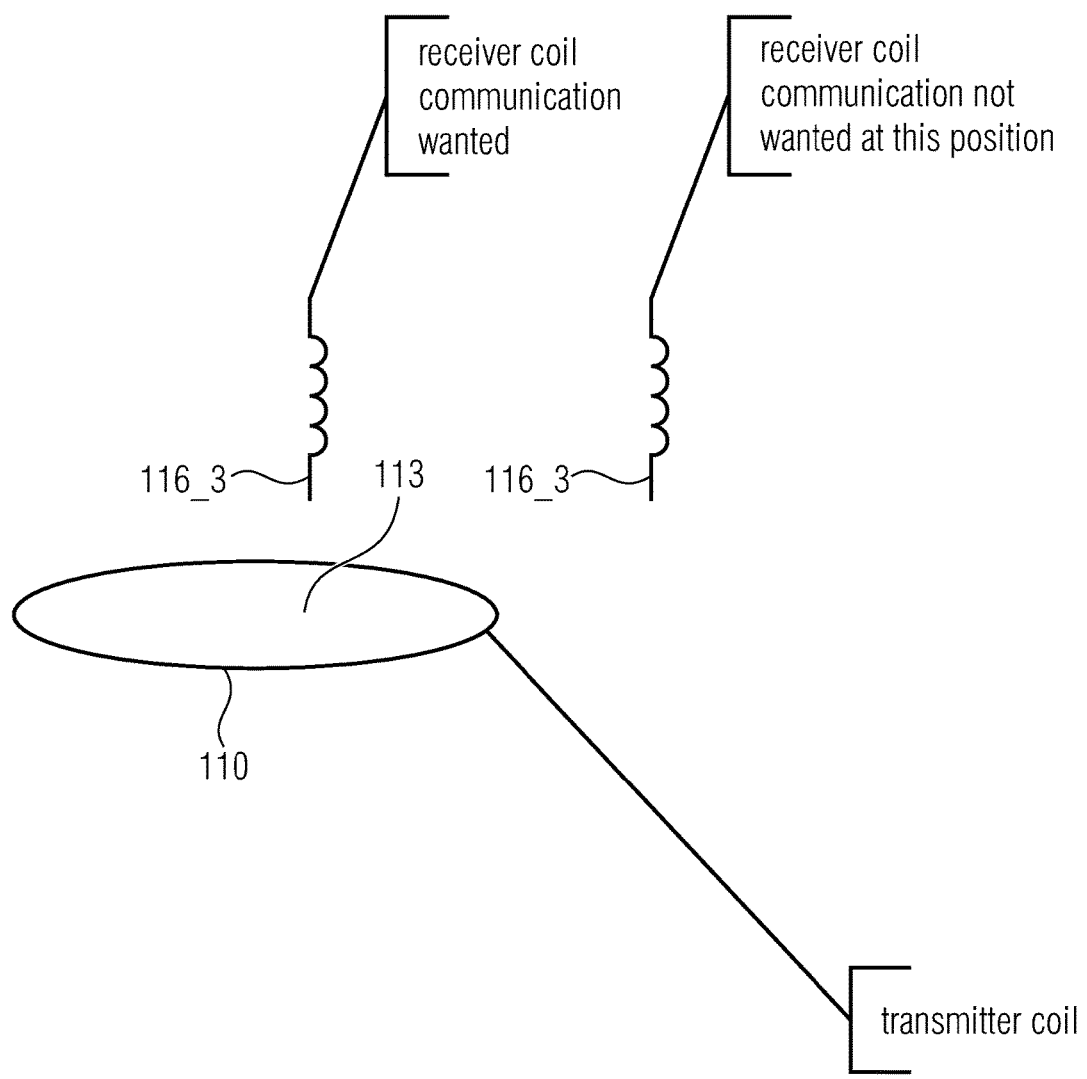
FIG. 11 is a schematic block diagram of a conductor loop array as well as a correctly positioned z coil and an incorrectly positioned z coil.

With the above described device 100 and the above described method 200, respectively, it is hence also possible to ensure also in an inductive data transmission system that transmission can only take place when the receiver coil is inside 113 or even at a specific position inside 113 the transmitter coil 110. For this, the receiver coil 116_3 can be geometrically smaller than the transmitter coil 110 of the system and the signal evaluation can be applicable as basically shown in FIG. 3, respectively. The step of position determination can take place, e.g., prior to the actual communication transmission. Thereby, in particular in adjacent transmission stations, erroneous allocation of the communication partners, e.g. due to overshoots, is prevented, cf. FIG. 11.

Figure 12:
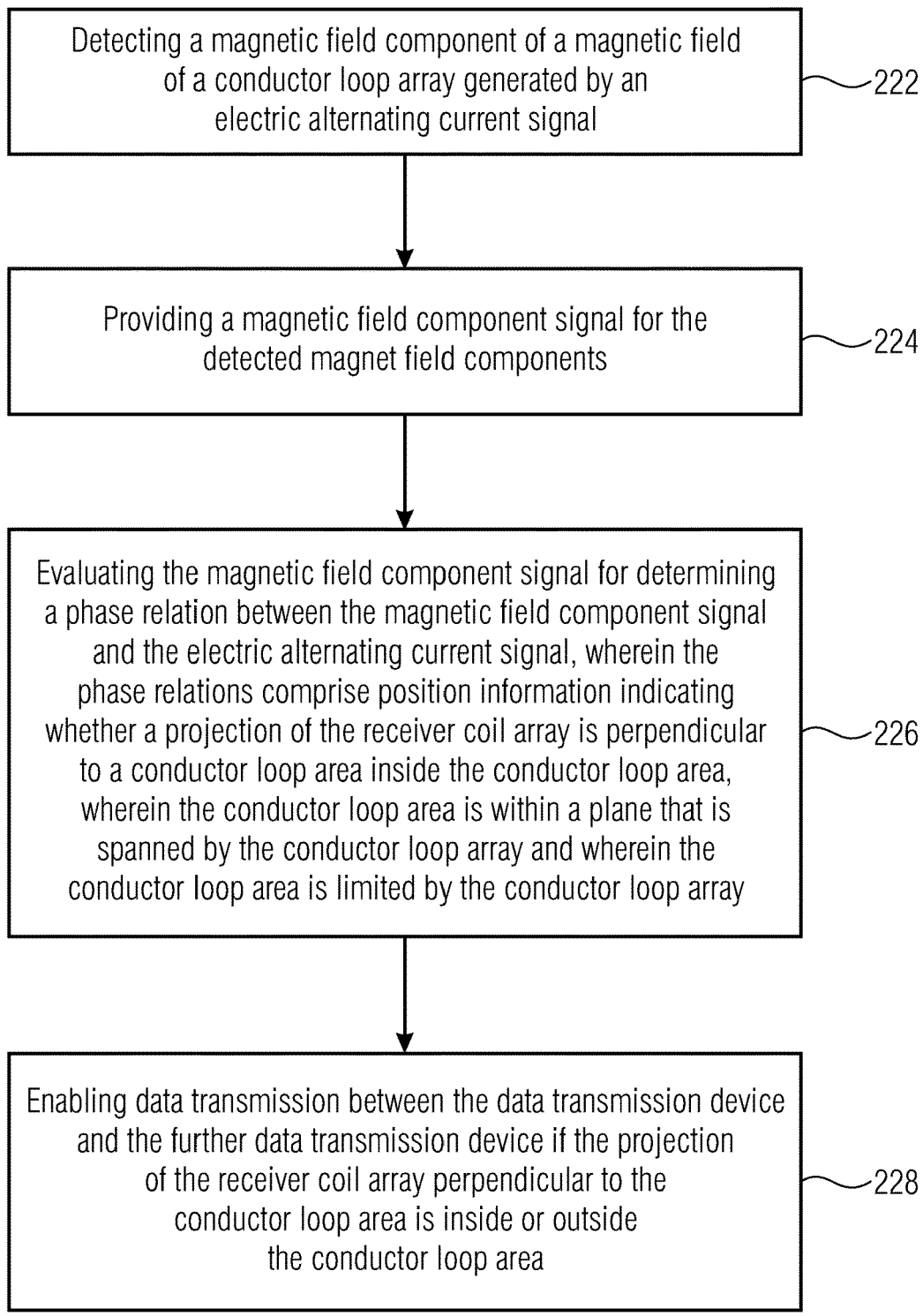
FIG. 12 is a flow diagram of a method for data transmission between a data transmission device and a further data transmission device.

FIG. 12 shows a flow diagram of a method for data transmission between a data transmission device and a further data transmission device. The method includes a step 222 of detecting a magnetic field component of a magnetic field of a conductor loop array generated by an electric alternating current signal; a step 224 of providing a magnetic field component signal for the detected magnetic field component; a step 226 of evaluating the magnetic field component signal to determine a phase relation between the magnetic field component signal and the electric alternating current signal, wherein the phase relations comprise position information indicating whether a projection of the receiver coil array is perpendicular to a conductor loop area inside the conductor loop area, wherein the conductor loop area is within a plane that is spanned by the conductor loop array, and wherein the conductor loop area is limited by the conductor loop array; and a step 228 of enabling the data transmission between the data transmission device and the further data transmission device as long as the projection of the receiver coil array is perpendicular to the conductor loop area inside or outside the conductor loop area.

Although some aspects have been described in the context of an apparatus, it is obvious that these aspects also represent a description of the corresponding method, such that a block or device of an apparatus also corresponds to a respective method step or a feature of a method step. Analogously, aspects described in the context of a method step also represent a description of a corresponding block or detail or feature of a corresponding apparatus. Some or all of the method steps may be executed by (or using) a hardware apparatus, like, for example, a microprocessor, a programmable computer or an electronic circuit. In some embodiments, some or several of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray disc, a CD, an ROM, a PROM, an EPROM, an EEPROM or a FLASH memory, a hard drive or another magnetic or optical memory having electronically readable control signals stored thereon, which cooperate or are capable of cooperating with a programmable computer system such that the respective method is performed. Therefore, the digital storage medium may be computer readable.

Some embodiments according to the invention include a data carrier comprising electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer.

The program code may for example be stored on a machine readable carrier.

Other embodiments comprise the computer program for performing one of the methods described herein, wherein the computer program is stored on a machine readable carrier. In other words, an embodiment of the inventive method is, therefore, a computer program comprising a program code for performing one of the methods described herein, when the computer program runs on a computer.

A further embodiment of the inventive methods is, therefore, a data carrier (or a digital storage medium or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transmit a computer program for performing one of the methods described herein to a receiver. The transmission can be performed electronically or optically. The receiver may, for example, be a computer, a mobile device, a memory device or the like. The apparatus or system may, for example, comprise a file server for transferring the computer program to the receiver.

In some embodiments, a programmable logic device (for example a field programmable gate array, FPGA) may be used to perform some or all of the functionalities of the methods described herein. In some embodiments, a field programmable gate array may cooperate with a microprocessor in order to perform one of the methods described herein. Generally, the methods are performed by any hardware apparatus. This can be a universally applicable hardware, such as a computer processor (CPU) or hardware specific for the method, such as ASIC.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A measuring device, comprising:
a receiver coil array that is configured to detect three magnetic field components of a magnetic field of a conductor loop array generated by an electric alternating current signal and to provide a magnetic field component signal for each of the detected three magnetic field components, wherein the receiver coil array is configured to detect the three magnetic field components along linearly independent directions; and
an evaluator configured to evaluate the magnetic field component signals for determining, for the magnetic field component signals, allocated phase relations to the electric alternating current signal, wherein the phase relations each comprise coarse position information of the receiver coil array relative to the conductor loop array, and wherein the evaluator is configured to determine a resulting intersection of the coarse position information, wherein the resulting intersection comprises fine position information of the receiver coil array relative to the conductor loop array.

2. The measuring device according to claim 1, wherein a positioning area is allocated to the conductor loop array, wherein the positioning area runs parallel to a conductor loop plane that is spanned by the conductor loop array and wherein the positioning area is of the same size or greater than a conductor loop area that is within the conductor loop plane and is limited by the conductor loop array; and
wherein the coarse position information each indicates a coarse region of several possible coarse regions of the positioning area, wherein the coarse regions indicated by the coarse position information overlap.

3. The measuring device according to claim 2, wherein the fine position information indicates a fine region of several possible fine regions of the positioning area resulting from the intersection of the indicated coarse regions.

4. The measuring device according to claim 3, wherein the evaluator is configured to output a position signal based on the fine region resulting from the intersection of the indicated coarse regions, indicating a position of the receiver coil array relative to the conductor loop array.

5. The measuring device according to claim 3, wherein directional information pointing to the geometric centroid of the conductor loop array is allocated to the fine regions of the positioning area, wherein the evaluator is configured to output a directional signal indicating an estimated direction to the geometric centroid of the conductor loop array based on the directional information allocated to the fine region resulting from the intersection of the indicated coarse regions.

6. The measuring device according to claim 2, wherein the phase relations that are allocated to the magnetic field component signals are respectively one of a first phase, a second phase or a phase jump, wherein the coarse position information comprised by the phase relations indicates in the phase jump a first coarse region of the possible coarse regions, wherein the coarse position information indicates in the first phase a second coarse region of the possible coarse regions and wherein the coarse position information indicates in the second phase a third coarse region of the possible coarse regions, wherein the first coarse region, the second coarse region and the third coarse region that are indicated by the respective coarse position information do not overlap.

7. The measuring device according to claim 1, wherein the magnetic field of the conductor loop array is generated by an unbalanced electric alternating current signal; and
wherein the evaluator is configured to evaluate the magnetic field component signals for determining amplitude curves of the magnetic field components, wherein the amplitude curves each comprise additional position information of the receiver coil array relative to the conductor loop array, and wherein the evaluator is configured to combine the additional position information and the coarse position information or fine position information.

8. The measuring device according to claim 1, wherein the phase relation is a phase shift to the electric alternating current signal or a phase jump.

9. The measuring device according to claim 1, wherein a first phase-relation allocated to a first magnetic field component signal of the magnetic field component signals comprises a phase jump when crossing a conductor region of the conductor loop array.

10. The measuring device according to claim 1, wherein at least a second phase relation allocated to a second magnetic field component signal of the magnetic field component signals comprises a phase jump when crossing a geometric centroid of the conductor loop array.

11. The measuring device according to claim 1, wherein the three linearly independent directions are orthogonal directions.

12. The measuring device according to claim 1, wherein the receiver coil array comprises three coils that are arranged relative to one another to detect the three magnetic field components of the generated magnetic field of the conductor loop array.

13. A positioning system, comprising:
The measuring device according to claim 1; and
a conductor loop array.

14. Usage of a measuring device according to claim 1 for positioning a vehicle on a charging device for charging an electric energy storage of the vehicle, wherein the charging device comprises the conductor loop array.

15. A measuring method, comprising:
detecting three magnetic field components of a magnetic field of a conductor loop array generated by an electric alternating current signal, wherein the magnetic field components are detected along linearly independent directions;
providing a magnetic field component signal for each of the detected three magnetic field components; and
evaluating the magnetic field component signals for determining, for the magnetic field component signals, allocated phase relations to the electric alternating current signal, wherein the phase relations each comprise coarse position information of the receiver coil array relative to the transmitter coil array;
wherein evaluating comprises determining a resulting intersection of the coarse position information, wherein the resulting intersection comprises/results in fine position information of the receiver coil array relative to the conductor loop array.

16. A non-transitory digital storage medium having a computer program stored thereon to perform the measuring method, the method comprising:
detecting three magnetic field components of a magnetic field of a conductor loop array generated by an electric alternating current signal, wherein the magnetic field components are detected along linearly independent directions;
providing a magnetic field component signal for each of the detected three magnetic field components; and
evaluating the magnetic field component signals for determining, for the magnetic field component signals, allocated phase relations to the electric alternating current signal, wherein the phase relations each comprise coarse position information of the receiver coil array relative to the transmitter coil array;
wherein evaluating comprises determining a resulting intersection of the coarse position information, wherein the resulting intersection comprises/results in fine position information of the receiver coil array relative to the conductor loop array, when said computer program is run by a computer.

17. A data transmission device, comprising:
a data transceiver;
a receiver coil array that is configured to detect at least one magnetic field component of a magnetic field of a conductor loop array generated by an electric alternating current signal of a further data transmission device and to provide a magnetic field component signal for the detected magnetic field component;
evaluator configured to evaluate the magnetic field component signal for determining a phase relation between the magnetic field component signal and the electric alternating current signal, wherein the phase relations comprise position information indicating whether a projection of the receiver coil array is perpendicular to a conductor loop area inside the conductor loop area, wherein the conductor loop area is within a plane spanned by the conductor loop array, and wherein the conductor loop area is limited by the conductor loop array; and
a controller configured to enable data transmission of the data transceiver only when the projection of the receiver coil array is perpendicular to the conductor loop area inside or outside the conductor loop area.

18. The data transmission device according to claim 17, wherein the receiver coil array is configured to detect a magnetic field component of the magnetic field of the conductor loop array running orthogonally to the conductor loop area.

19. Data transmission system, comprising:
a data transmission device according to claim 17; and
a further data transmission device with the conductor loop array.

20. A method for data transmission between a data transmission device and a further data transmission device comprising:
detecting a magnetic field component of a magnetic field of a conductor loop array generated by an electric alternating current signal;
providing a magnetic field component signal for the detected magnetic field component;
evaluating the magnetic field component signal for determining a phase relation between the magnetic field component signal and the electric alternating current signal, wherein the phase relations comprise position information indicating whether a projection of the receiver coil array is perpendicular to a conductor loop area inside the conductor loop area, wherein the conductor loop area is within a plane that is spanned by the conductor loop array and wherein the conductor loop area is limited by the conductor loop array;

enabling data transmission between the data transmission device and the further data transmission device if the projection of the receiver coil array perpendicular to the conductor loop area is inside or outside the conductor loop area.

* * * * *